US012523781B2

(12) United States Patent
Ishihara et al.

(10) Patent No.: US 12,523,781 B2
(45) Date of Patent: Jan. 13, 2026

(54) ELECTRONIC CONTROL DEVICE

(71) Applicant: HITACHI CONSTRUCTION MACHINERY CO., LTD., Tokyo (JP)

(72) Inventors: Shinji Ishihara, Tokyo (JP); Shiho Izumi, Tokyo (JP); Kenta Nakagi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 197 days.

(21) Appl. No.: 18/279,447

(22) PCT Filed: May 31, 2022

(86) PCT No.: PCT/JP2022/022137
§ 371 (c)(1),
(2) Date: Aug. 30, 2023

(87) PCT Pub. No.: WO2022/255362
PCT Pub. Date: Dec. 8, 2022

(65) Prior Publication Data
US 2024/0134064 A1 Apr. 25, 2024
US 2024/0230922 A9 Jul. 11, 2024

(30) Foreign Application Priority Data
Jun. 4, 2021 (JP) .................. 2021-094540

(51) Int. Cl.
G01S 19/40 (2010.01)
E02F 9/26 (2006.01)
(Continued)

(52) U.S. Cl.
CPC ............... G01S 19/40 (2013.01); E02F 9/26 (2013.01); G01S 19/396 (2019.08); G01S 19/49 (2013.01); G01S 19/53 (2013.01)

(58) Field of Classification Search
CPC ........ G01S 19/40; G01S 19/396; G01S 19/49; G01S 19/53; E02F 9/26
(Continued)

(56) References Cited

U.S. PATENT DOCUMENTS

2005/0197755 A1* 9/2005 Knowlton ............... G01S 19/53
701/50
2010/0073227 A1* 3/2010 Waters .................... G01S 19/26
342/357.48
(Continued)

FOREIGN PATENT DOCUMENTS

JP 2007-147588 A 6/2007
KR 2016-0008785 A 1/2016

OTHER PUBLICATIONS

International Search Report of PCT/JP2022/022137 dated Jul. 26, 2022.
(Continued)

Primary Examiner — Manglesh M Patel
(74) Attorney, Agent, or Firm — MATTINGLY & MALUR, PC

(57) ABSTRACT

An electronic control device capable of suppressing variations in the position of a work machine calculated based on satellite signals received by a GNSS terminal due to changes in the GNSS communication environment, and eliminating the position error after improvement of the communication environment in a shorter time than before. The electronic control device determines whether the positioning quality is good or poor based on GNSS; information, determines the traveling state, including a stop state, based on the velocity of the work machine, and performs smoothing processing to the GNSS information. The processing intensity is changed to weak if the smoothing condition is not satisfied, the condition being that the positioning quality is good and the traveling state is stop, and the processing intensity is
(Continued)

changed to strong after a time equivalent to update cycle since the smoothing condition has been satisfied.

9 Claims, 17 Drawing Sheets

(51) Int. Cl.
*G01S 19/39* (2010.01)
*G01S 19/49* (2010.01)
*G01S 19/53* (2010.01)

(58) Field of Classification Search
USPC .................................................. 701/468, 469
See application file for complete search history.

(56) References Cited

U.S. PATENT DOCUMENTS

| | | | |
|---|---|---|---|
| 2016/0376772 A1 | 12/2016 | Kondo et al. | |
| 2021/0010246 A1* | 1/2021 | Sherlock | G01S 19/41 |
| 2023/0026395 A1* | 1/2023 | Reimer | G01S 19/40 |
| 2023/0235532 A1* | 7/2023 | Ishihara | G01S 19/14 |
| | | | 701/50 |
| 2024/0045080 A1* | 2/2024 | MacGougan | G01S 19/26 |

OTHER PUBLICATIONS

Extended European Search Report received in corresponding European Application No. 22816108.9 dated Mar. 11, 2025.
Korean Office Action received in corresponding Korean Application No. 10-2023-7028861 dated Jun. 23, 2025.

\* cited by examiner

Fig. 14
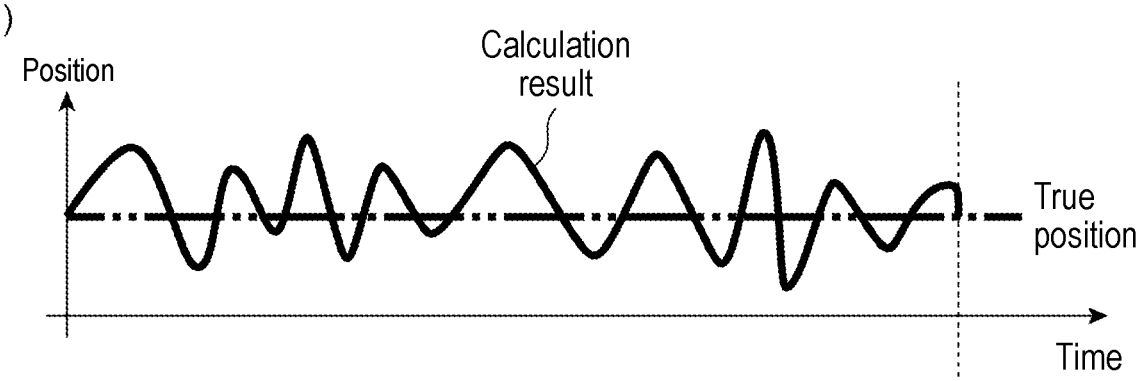
(d)
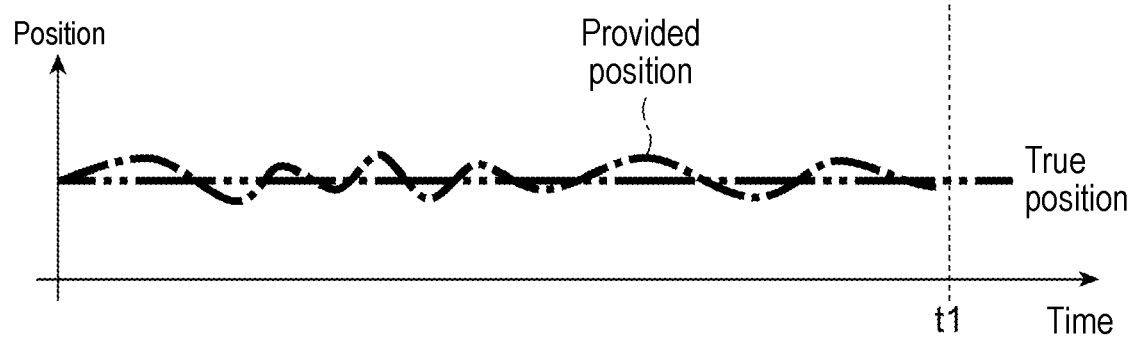
(e)

ELECTRONIC CONTROL DEVICE

TECHNICAL FIELD

The present disclosure relates to electronic control units or devices to be mounted on a work machine.

BACKGROUND ART

Conventionally, inventions related to a position measurement system for work machine have been known, which calculates the absolute position and posture of a work machine such as hydraulic excavators in three-dimensional (3D) space and the absolute positions of monitor points set on the work machine in 3D space (Patent Document 1 below). This conventional position measurement system for work machine has a plurality of 3D position measurement devices, a position and posture calculation means, and a monitor display device (claim 1 and others in the same document).

The plurality of 3D position measurement devices are located on the vehicle body of the work machine, and measures absolute positions in 3D space, respectively. This position and posture calculation means uses the measurements by the plurality of 3D position measurement devices to calculate the position and posture of the work machine and the absolute positions of the monitor points set on the work machine in the 3D space. The monitor display device displays an image of the work machine and topographical information such as a target landform based on the calculation result by the position and posture calculation means.

This conventional position measurement system for work machine further includes a determination means that determines the operating state of the work machine, and a smoothing means that smooths the calculated values of the position and posture of the work machine that are calculated by the position and posture calculation means in accordance with the detection result of the determination means. This smoothing means is, for example, a filtering operation means that performs low-pass filtering on the time axis (claim 6 in the same document).

With this configuration, this conventional position measurement system calculates the position and posture of the work machine and the absolute positions of the monitor points set on the work machine in 3D space, and displays an image of the work machine based on the result of this calculation. At this time, when the body of the work machine is in a stationary state, wobbling of the display is reduced, and when the body of the working machine is not in a stationary state, the deterioration of the followability of the display is suppressed and accordingly the work efficiency is improved. (paragraph 0022 in the same document).

CITATION LIST

Patent Literature

Patent Document 1: JP 2007-147588 A

SUMMARY OF INVENTION

Technical Problem

For the above conventional position measurement system, if the communication environment of the plurality of 3D position measurement devices deteriorates, for example, an error will occur in the calculation result of the position and posture calculation means. Subsequently, when the communication environment improves and the error in the calculation results is solved, the conventional position measurement system as stated above has room for improvement in shortening the time required before eliminating the error in position and posture of the work machine, which is the calculated value of the above-mentioned smoothing means.

The present disclosure provides an electronic control unit or device capable of suppressing variations in the position of a work machine calculated based on satellite signals received by a global navigation satellite system (GNSS) terminal due to changes in the GNSS communication environment, and eliminating the position error after improvement of the communication environment in a shorter time than before.

Solution to Problem

One aspect of the present disclosure is an electronic control device to be mounted on a work machine, includes: a positioning quality determination section configured to determine whether positioning quality is good or poor based on GNSS information, the GNSS information including position information and a positioning state that are calculated from a satellite signal received by a GNSS antenna mounted on the work machine; a traveling state determination section configured to determine a traveling state of the work machine based on velocity information detected using a velocity detection device; and a smoothing section configured to perform smoothing processing to the GNSS information with a first intensity when a smoothing condition is satisfied, the smoothing condition being that a result of the positioning quality determination by the positioning quality determination section is good and a result of the traveling state determination by the traveling state determination section is a stop state, and to perform smoothing processing to the GNSS information with a second intensity lower than the first intensity when the smoothing condition is not satisfied. When a state where the smoothing condition is not satisfied changes to a state where the smoothing condition is satisfied, the smoothing section changes the processing intensity from the second intensity to the first intensity after a predetermined time from the time when the smoothing condition is satisfied.

Advantageous Effects of Invention

The one aspect of the present disclosure provides an electronic control unit or device capable of suppressing variations in the position of the work machine calculated based on the GNSS information due to a change in the GNSS communication environment, and eliminating the position error after improvement of the communication environment in a shorter time than before.

BRIEF DESCRIPTION OF DRAWINGS

FIG. 14 is an enlarged view of graphs (d) and (e) shown in FIG. 13.

DESCRIPTION OF EMBODIMENTS

The following describes some embodiments of an electronic control unit or device according to the present disclosure, with reference to the drawings.

Embodiment 1

Figure 1:
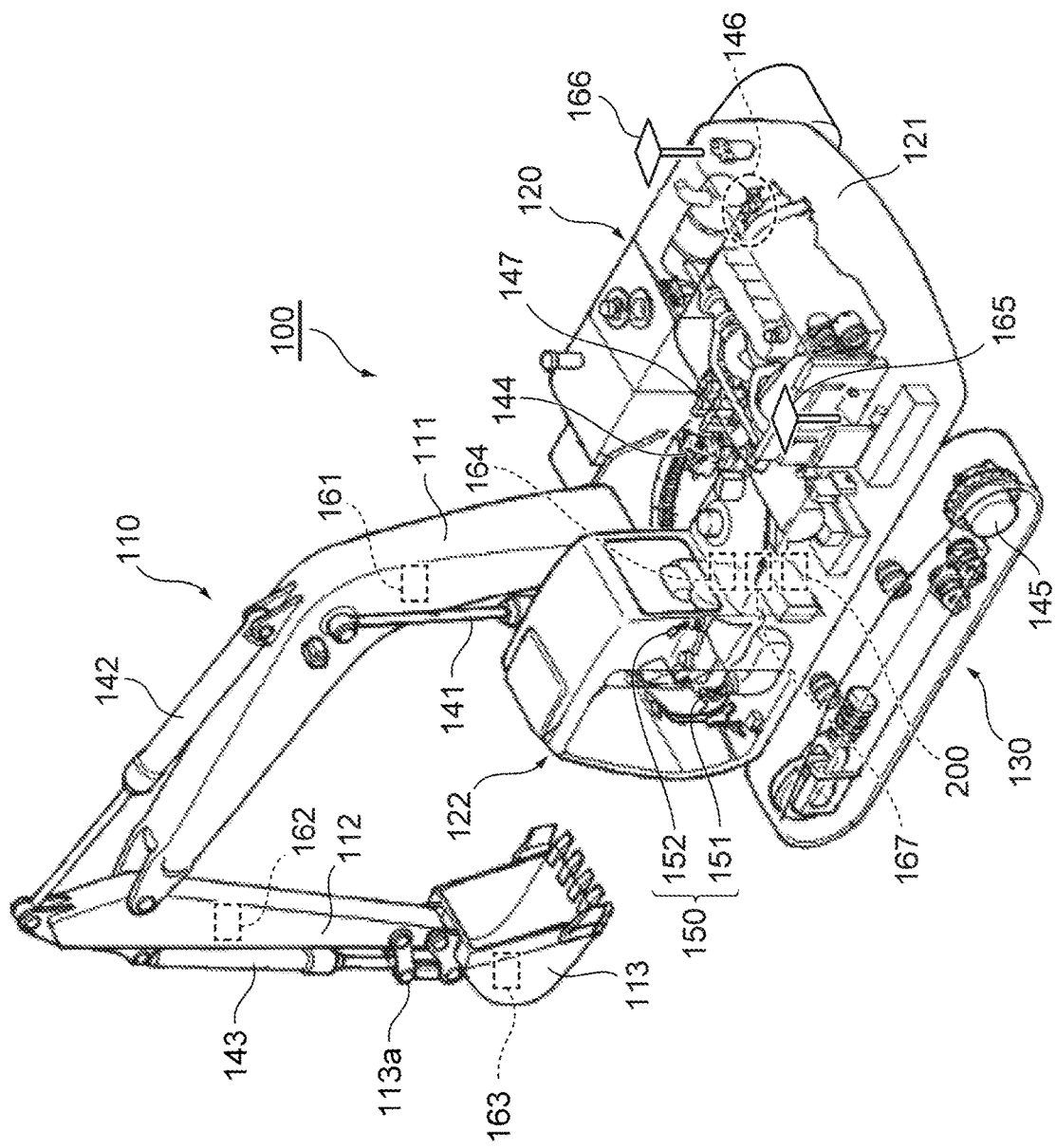
FIG. 1 is a perspective view of a work machine, showing one embodiment of an electronic control device according to the present disclosure.
Figure 2:
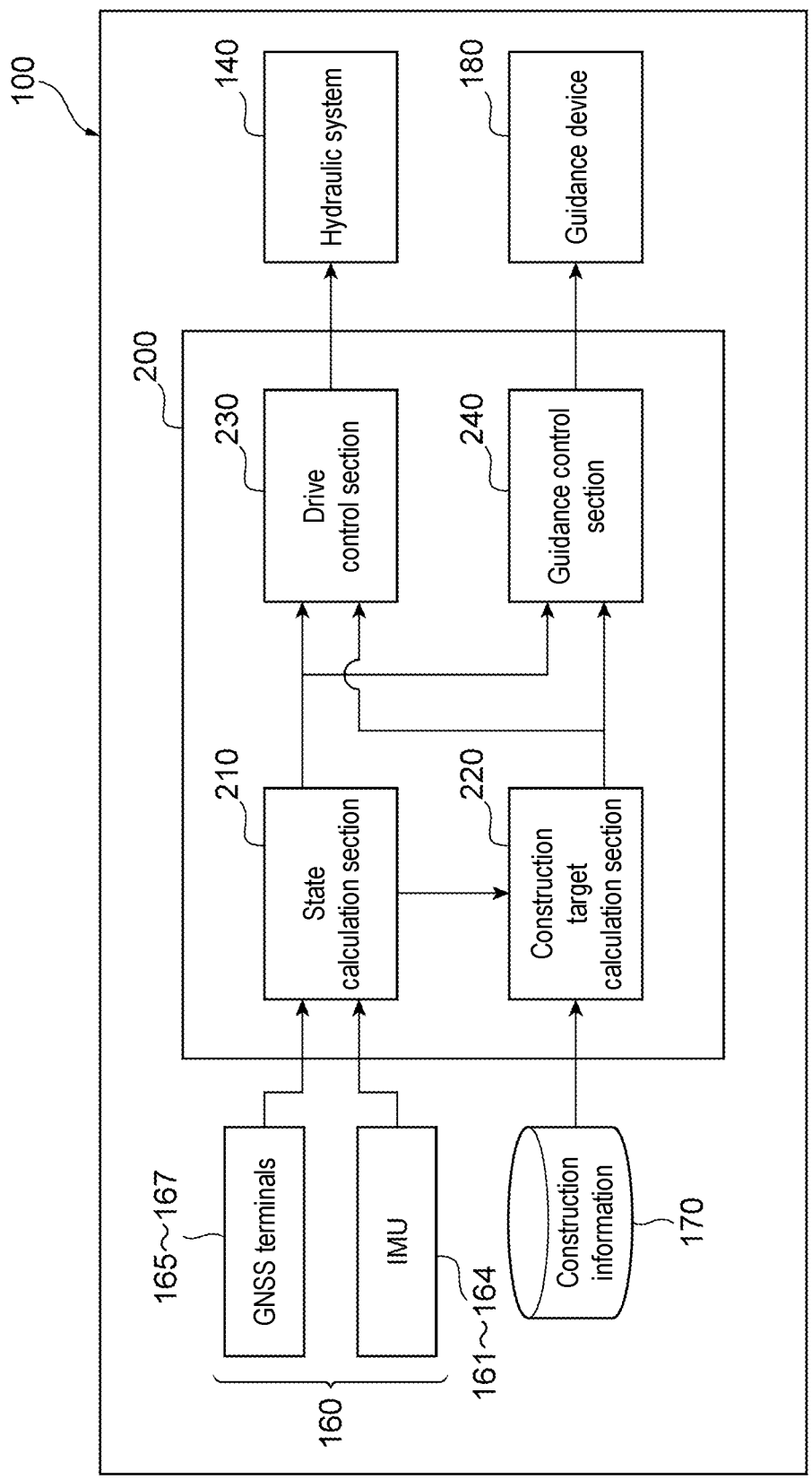
FIG. 2 is a schematic block diagram of the work machine of FIG. 1.

FIG. 1 is a perspective view of a work machine, showing one embodiment of an electronic control unit or device according to the present disclosure. FIG. 2 is a schematic block diagram of the work machine 100 in FIG. 1. The electronic control unit or device 200 in this embodiment is mounted on a work machine 100 such as a hydraulic excavator. The work machine 100 is not limited to hydraulic excavators, but may be other machines such as a wheel loader, road machine, dump truck, and dual-arm machine.

In the example shown in FIGS. 1 and 2, the work machine 100, which is a hydraulic excavator, includes a front unit 110, an upper slewing body 120, a lower traveling body 130, a hydraulic system 140, an operating unit 150, and a sensing unit 160. For instance, the work machine 100 also includes an engine, a fuel tank, a hydraulic device, and a hydraulic oil tank.

The front unit 110 has a plurality of driven members, such as a boom 111, arm 112, and bucket 113. The front unit 110 is a multi-joint working unit having these driven members that are rotatably connected to each other via rotation shafts parallel to the width direction of the work machine 100. The front unit 110 may be called a "front work machine".

The upper slewing body 120 is slewable relative to the lower traveling body 130. For instance, the upper slewing body 120 houses the engine, fuel tank, hydraulic device, and hydraulic oil tank, and constitutes the body 121 of the work machine 100. The upper slewing body 120 is connected to the proximal end of the boom 111 at the front via a rotation shaft parallel to the width direction of the work machine 100. The front part of the upper slewing body 120 is provided with an operator's cab 122 at the lateral of the boom 111.

For instance, the lower traveling body 130 includes crawler tracks on both sides in the width direction of the work machine 100, and rotates the crawler tracks to cause the work machine 100 to travel.

For instance, the hydraulic system 140 includes a boom cylinder 141, an arm cylinder 142, a bucket cylinder 143, a swivel motor 144, left and right driving motors 145, a hydraulic pump 146, and a control valve 147. For instance, the boom cylinder 141, arm cylinder 142, and bucket cylinder 143 are hydraulic cylinders, and the swivel motor 144 and driving motors 145 are hydraulic motors.

The boom cylinder 141 has a proximal end of the cylinder and a distal end of the piston rod that are connected to the upper slewing body 120 and the middles of the boom 111, respectively. The boom cylinder 141 extends and retracts the piston rod to rotate the boom 111 up and down relative to the upper slewing body 120 around a rotating shaft that connects the proximal end of the boom 111 to the front of the upper slewing body 120.

The arm cylinder 142 has a proximal end of the cylinder and a distal end of the piston rod that are connected to the middles of the boom 111 and the proximal end of the arm 112, respectively. The arm cylinder 142 extends and retracts the piston rod to rotate the arm 112 relative to the boom 111 around a rotating shaft that connects the proximal end of the arm 112 to the distal end of the boom 111.

The bucket cylinder 143 has a proximal end of the cylinder and a distal end of the piston rod that are connected to the proximal end of the arm 112 and a bucket link 113a, respectively. The bucket cylinder 143 extends and retracts the piston rod to rotate the bucket 113 relative to the arm 112 around a rotating shaft that connects the proximal end of the bucket 113 to the distal end of the arm 112 via the bucket link 113a.

For instance, the swivel motor 144 is located at the upper slewing body 120 and turns the upper slewing body 120 relative to the lower traveling body 130 around a rotary shaft parallel to the height direction of the work machine 100. The driving motors 145 are located on both sides in the width direction of the lower traveling body 130, and rotates the crawler tracks located on both sides in the width direction of the lower traveling body 130 to cause the work machine 100 to travel.

For instance, the hydraulic pump 146 is driven by a prime mover such as an engine or a motor, and pressure-feeds the hydraulic oil in the hydraulic oil tank to the control valve 147.

The control valve 147 controls the direction and flow rate of hydraulic fluid supplied from the hydraulic pump 146, thereby controlling the operation of the boom cylinder 141, arm cylinder 142, bucket cylinder 143, swivel motor 144, and left and right driving motors 145. For instance, the control valve 147 receives, as an input, a drive signal that is pilot pressure supplied from a pilot pump (not shown) via an electromagnetic proportional valve, thus controlling the direction and flow rate of the hydraulic fluid.

For instance, the operating unit 150 includes operating levers 151, 152 and an operating pedal (not shown). For instance, the operating levers 151 and 152 are located on the left and right at the driver's seat inside the operator's cab 122, and detect their displacement in response to the operation by the operator of the work machine 100. In accordance with the detected displacements, the operating levers 151 and 152 output operation signals to drive the boom cylinder 141, arm cylinder 142, and bucket cylinder 143 to the electronic control device 200 via wiring. That is, the operating levers 151 and 152 are assigned operations of the boom cylinder 141, arm cylinder 142, and bucket cylinder 143 in the forward/backward and the left/right directions, respectively, for example.

For instance, the operating levers 151 and 152 can be of a hydraulic pilot type. In this case, the operating levers 151 and 152 supply pilot pressure corresponding to the operating direction and displacement of the levers by the operator to the control valve 147 as a drive signal. This allows the boom cylinder 141, arm cylinder 142, and bucket cylinder 143 to be driven in accordance with the operating direction and displacement of the levers by the operator.

For instance, the sensing unit 160 includes inertial measurement units (IMU) 161 to 164 and global navigation satellite system (GNSS) terminals 165 to 167. For instance, the IMUs 161 to 164 include a boom IMU 161, an arm IMU 162, a bucket IMU 163, and a body IMU 164. For instance, the GNSS terminals 165 to 167 include left and right GNSS antennas 165 and 166 and a GNSS receiver 167.

The boom IMU 161, arm IMU 162, and bucket IMU 163 are placed at appropriate locations on the boom 111, arm 112, and bucket 113, respectively, to detect the posture of the boom 111, arm 112, and bucket 113. The bucket IMU 163 may be located on the bucket link 113a.

For instance, the body IMU 164 is placed on the body 121 of the work machine 100 at the upper slewing body 120. The body IMU 164 detects the angular velocity and acceleration of the body 121, and calculates the pitch angle, which is the inclination of the body 121 in the front-back direction, and the roll angle, which is the inclination of the body 121 in the width direction. Specifically, the body IMU 164 can calculate the pitch angle and roll angle of the body 121 when the upper slewing body 120 is not rotating. The calculation is based on the relative positional relationship with the body 121 and the direction of gravitational acceleration (vertically downward direction) in the IMU coordinate system.

In this embodiment, it is assumed that these IMUs 161 to 164 have an angle calculation function. When the IMUs 161 to 164 do not have an angle calculation function, the electronic control device 200 can perform angle calculations based on the detection results of the IMUs 161 to 164.

For instance, the GNSS antennas 165 and 166 are spaced apart on both sides in the width direction of the body 121 at the rear that is a part of the upper slewing body 120. For instance, the GNSS antennas 165, 166 are connected to the GNSS receiver 167 via wiring. The GNSS antennas 165 and 166 transmit signals received from a positioning satellite to the GNSS receiver 167 via wiring.

The GNSS receiver 167 performs various calculations using signals received from the GNSS antennas 165 and 166 via wiring to generate GNSS information. For instance, the GNSS information includes the position coordinates of the GNSS antennas 165 and 166, the azimuth angle of the body 121 based on the position coordinates, and the positioning states of the GNSS terminals 165 to 167.

For instance, the GNSS receiver 167 uses statistical processing by a Kalman filter to calculate the position coordinates and azimuth angle, and simultaneously calculates the variances of the position coordinates and azimuth angle. For instance, the GNSS receiver 167 can also calculate the velocity of the body 121 with the GNSS antennas 165 and 166 placed thereon.

For instance, the GNSS receiver 167 is connected via a wireless communication line to a reference station installed at the work site of the work machine 100 and performs real time kinematic (RTK) positioning. When no reference station is installed at the work site, the GNSS receiver 167 may perform network-type RTK positioning that acquires information from an electronic reference station via the internet line. This embodiment assumes that the GNSS receiver 167 is capable of performing RTK positioning.

For instance, the GNSS receiver 167 is connected to the electronic control device 200 via wiring. For instance, the GNSS terminals 165 to 167 output GNSS information generated by the GNSS receiver 167 to the electronic control device 200 at a predetermined update cycle via wiring.

For instance, the electronic control device 200 controls the electromagnetic proportional valve in accordance with operation signals input from the operating levers 151 and 152 to control the operation of the boom cylinder 141, arm cylinder 142, bucket cylinder 143, swivel motor 144, and left and right driving motors 145. FIG. 2 omits the operating unit 150.

As described above, the work machine 100 includes the hydraulic system 140, the GNSS terminals 165 to 167, the IMUs 161 to 164, and the electronic control device 200. As shown in FIG. 2, the work machine 100 also includes a storage device 170, for example. The storage device 170 includes nonvolatile memory, such as ROM and hard disk, for example, and have construction information, including 3D construction drawings, stored in advance by the construction manager or other persons.

As shown in FIG. 2, the work machine 100 further includes a guidance device 180, for example. For instance, the guidance device 180 is located inside the operator's cab 122 and provides guidance to the operator of the work machine 100. Specifically, the guidance device 180 includes at least one of a display device, an indicator lamp, a speaker, and a buzzer, for example. In this embodiment, the guidance device 180 includes at least a display device such as a liquid crystal display device or an organic EL display device.

For instance, the electronic control device 200 of the present embodiment includes a microcontroller and firmware, and has a central processing unit (CPU), a memory such as ROM, a program stored in the memory, a timer, and an input/output section, which are not shown in the drawing. As shown in FIG. 2, the electronic control device 200 includes a state calculation section 210 and a construction target calculation section 220. For instance, the electronic control device 200 also includes a drive control section 230 and a guidance control section 240. Another electronic control device different from the electronic control device 200 may constitute the drive control section 230 and the guidance control section 240.

For instance, these sections of the electronic control device 200 indicate the functions of the electronic control device 200, which are implemented by executing a program stored in the memory by the CPU. These functions of the electronic control device 200 shown in FIG. 2 may be implemented by individual electronic control devices, or one or a plurality of functions may be implemented by one or a plurality of electronic control devices.

For instance, the state calculation section 210 receives, as an input, GNSS information output from the GNSS terminals 165 to 167. For instance, the GNSS information includes position information, azimuth information, velocity information of the two GNSS antennas 165 and 166, their variances, positioning states, and other types of information. For instance, the positioning state is classified based on the number of positioning satellites, correction information, and the like. In this case, the GNSS receiver 167 has a positioning calculation section that calculates GNSS information based on satellite signals received by the GNSS antennas 165 and 166, for example.

For instance, the state calculation section 210 may receive, as an input, GNSS satellite signals output from the GNSS terminals 165 to 167. That is, the GNSS receiver 167 of the GNSS terminals 165 to 167 outputs satellite signals received by the GNSS antennas 165 and 166, for example. In this case, the GNSS receiver 167 may not have the positioning calculation section as described above.

For instance, the state calculation section 210 receives, as an input, the position and posture of the front unit 110 output from the IMUs 161 to 163. Specifically, the boom IMU 161, arm IMU 162, and bucket IMU 163 output the posture and position of the front unit 110, including the posture and position of each part of the boom 111, arm 112, and bucket 113, for example.

For instance, the state calculation section 210 receives, as an input, the position and posture of the upper slewing body 120 of the work machine 100 output from the body IMU 164 of the IMUs 161 to 164. For instance, the state calculation section 210 may receive, as an input, the velocity of the upper slewing body 120 output from the body IMU 164.

Figure 3:
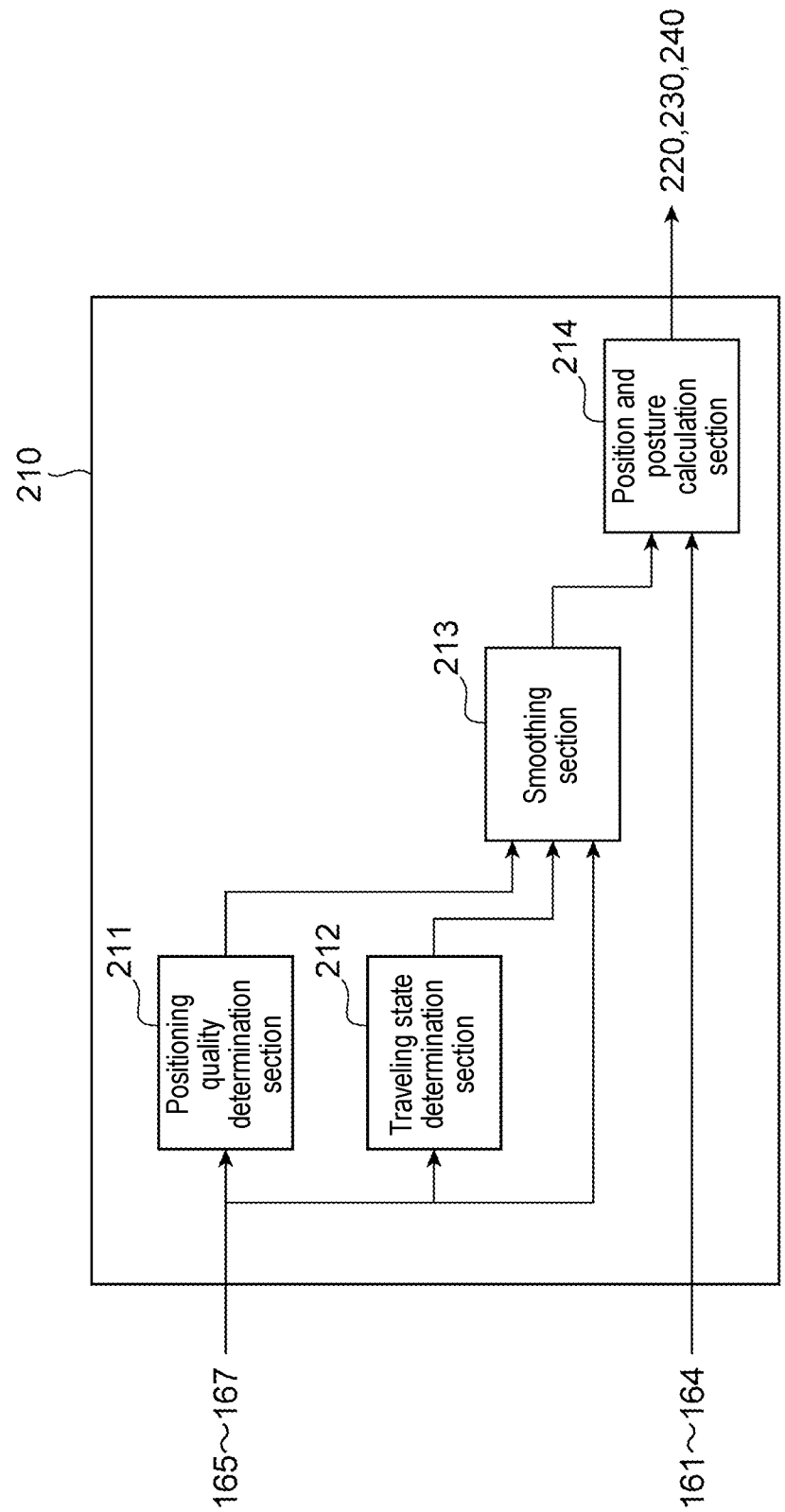
FIG. 3 is a block diagram showing one example of a state calculation section of the electronic control device in FIG. 2.
Figure 4:
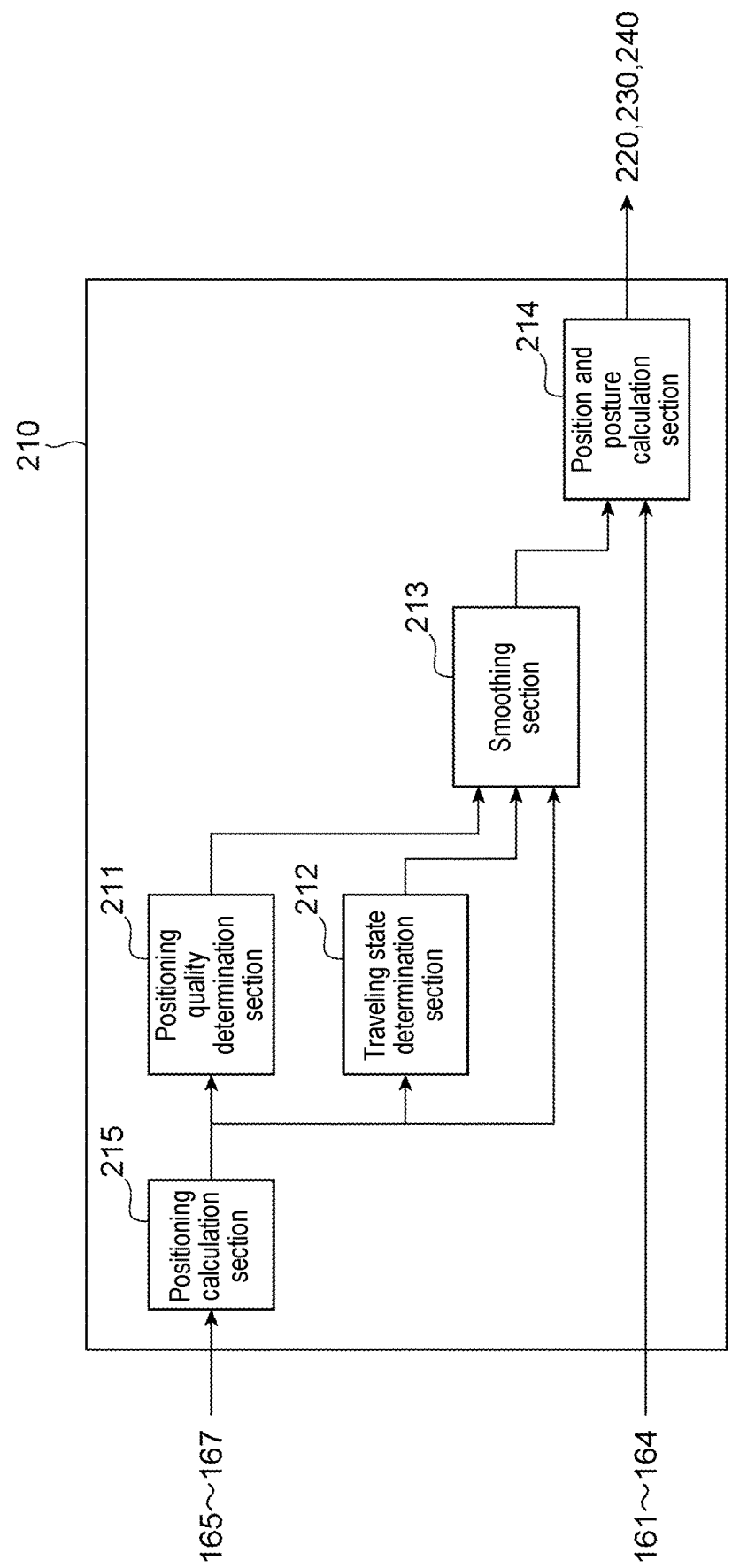
FIG. 4 is a block diagram showing one example of a state calculation section of the electronic control device in FIG. 2.

FIGS. 3 and 4 are block diagrams showing examples of the state calculation section 210 of the electronic control device 200 in FIG. 2. In the example shown in FIG. 3, the state calculation section 210 receives, as an input, GNSS information calculated based on satellite signals from the GNSS terminals 165 to 167. In the example shown in FIG. 4, the state calculation section 210 receives, as an input, satellite signals from the GNSS terminals 165 to 167.

In the example shown in FIG. 3, the state calculation section 210 includes a positioning quality determination section 211, a traveling state determination section 212, a smoothing section 213, and a position and posture calculation section 214. In the example shown in FIG. 4, the state calculation section 210 includes a positioning calculation section 215, in addition to the sections shown in FIG. 3. In the example shown in FIG. 3, the GNSS receiver 167 of the GNSS terminals 165 to 167 includes the configuration equivalent to the positioning calculation section 215 in FIG. 4.

For instance, the positioning calculation section 215 calculates, based on satellite signals input from the GNSS terminals 165 to 167, GNSS information including the position information, azimuth information, and velocity information of the two GNSS antennas 165, 166, their variances, positioning states, and other types of information. The positioning calculation section 215 outputs the GNSS information at a predetermined update cycle. When the GNSS information includes velocity information, the GNSS terminals 165 to 167 can be used as a velocity detection device to detect the velocity of the work machine 100.

For instance, the positioning state included in the GNSS information includes a RTK-Fix state and states other than RTK-Fix. For instance, the states other than RTK-Fix include a RTK-Float state, differential positioning, and single positioning.

The positioning quality determination section 211 receives, as an input, at least the positioning state of the GNSS information output at a predetermined update cycle from the positioning calculation section 215 or the positioning calculation section of the GNSS receiver 167. The positioning quality determination section 211 determines whether the positioning quality is good or poor based on the input positioning state. For instance, when the positioning state is the RTK-Fix state, the positioning quality determination section 211 determines the positioning quality to be "good", and when the positioning state is a state other than RTK-Fix, the positioning quality is determined to be "poor". The positioning quality determination section 211 outputs the result of determination of good or poor positioning quality to the smoothing section 213.

The traveling state determination section 212 receives, as an input, at least the velocity information of the GNSS information output from the positioning calculation section 215 or the positioning calculation section of the GNSS receiver 167. That is, the traveling state determination section 212 receives, as an input, the velocity information detected using the GNSS terminals 165 to 167 that are the velocity detection device mounted on the work machine 100. The traveling state determination section 212 determines the traveling state of the work machine 100, including the stop state, based on the input velocity information.

Specifically, the traveling state determination section 212 receives, as an input, the velocity $v_{aug}=(v_x, v_y, v_z)$ in the 3D space indicated by the following Equation (1a), which is the velocity information, from the positioning calculation section 215 or the GNSS receiver 167. For instance, if the input velocity $v_{aug}$ is equal to or less than a predetermined velocity threshold VII, as in the following Inequality (1b), the traveling state determination section 212 determines that the traveling state of the work machine 100 is a stop state.

[Mathematical 1]

$$v_{aug}=\sqrt{v_x^2+v_y^2+v_z^2} \qquad (1a)$$

$$v_{aug} \leq v_{th} \qquad (1b)$$

For instance, if the input velocity $v_{aug}$ does not satisfy the above Inequality (1b), that is, the velocity $v_{aug}$ is higher than the predetermined velocity threshold $V_{th}$, the traveling state determination section 212 determines that the traveling state of the work machine 100 is traveling. The velocity $v_{aug}$ itself shown in the above Equation (1a) may have variations. Thus, the velocity $v_{aug}$ smoothed by a low-pass filter may be used to determine the above Inequality (1b).

For instance, the velocity threshold $V_{th}$ can be set to 0 [km/h]. For instance, the velocity threshold $V_{th}$ can be set to a velocity higher than 0 [km/h]. In this case, the velocity threshold $V_{th}$ can be set to a velocity higher than the small velocity detected from the vibrations of work machine 100 when the work machine 100 is not moving, for example.

Specifically, the work machine 100 such as a hydraulic excavator is equipped with an engine. Thus, the GNSS antennas 165 and 166 mounted on the work machine 100 vibrate due to engine vibrations, and the velocity $v_{aug}$ based on the position information of these GNSS antennas 165 and 166 may not become 0 [km/h].

In such a case, the velocity threshold $V_{th}$ can be set to a velocity that is higher than the small velocity detected from vibrations of the work machine 100 and lower than the minimum moving velocity of the work machine 100. This prevents an erroneous determination by the traveling state determination section 212 on the stop state of the work machine 100 and enables a more accurate and reliable determination of the stop state of the work machine 100 by the traveling state determination section 212. These velocity $v_{aug}$ and minimum moving velocity of the work machine 100 can be designed based on experimental results.

The velocity calculation algorithm by the positioning calculation section 215 or the positioning calculation section of the GNSS receiver 167 uses a method using Doppler shift, which is independent of the position calculation algorithm.

This means that, even if the positioning quality is not "good", it is possible to calculate the accurate velocity.

The work machine 100 having crawler tracks as in a hydraulic excavator is often operated in situations where slippage is likely to occur, such as on slopes and mud. If slippage occurs at the work machine 100, the work machine 100 may move also when the work machine 100 is not traveling. Also in such a case, the GNSS terminals 165 to 167 can be used as a velocity detection device, whereby any movement of the work machine 100 unintended by the operator of the work machine 100 can be accurately detected.

The smoothing section 213 receives, as an input, the determination result of good or poor positioning quality output from the positioning quality determination section 211, the traveling state of the work machine 100 determined by the traveling state determination section 212, and the GNSS information output from the positioning calculation section 215 or GNSS receiver 167. The GNSS information input to the smoothing section 213 includes at least position information. The GNSS information input to the smoothing unit 213 may include, for example, azimuth information.

The smoothing section 213 performs smoothing processing to the GNSS information input from the positioning calculation section 215 or the GNSS receiver 167. The smoothing section 213 performs smoothing processing to the GNSS information with the processing intensity in accordance with the positioning quality input from the positioning quality determination section 211 and the traveling state input from the traveling state determination section 212.

Figure 5:
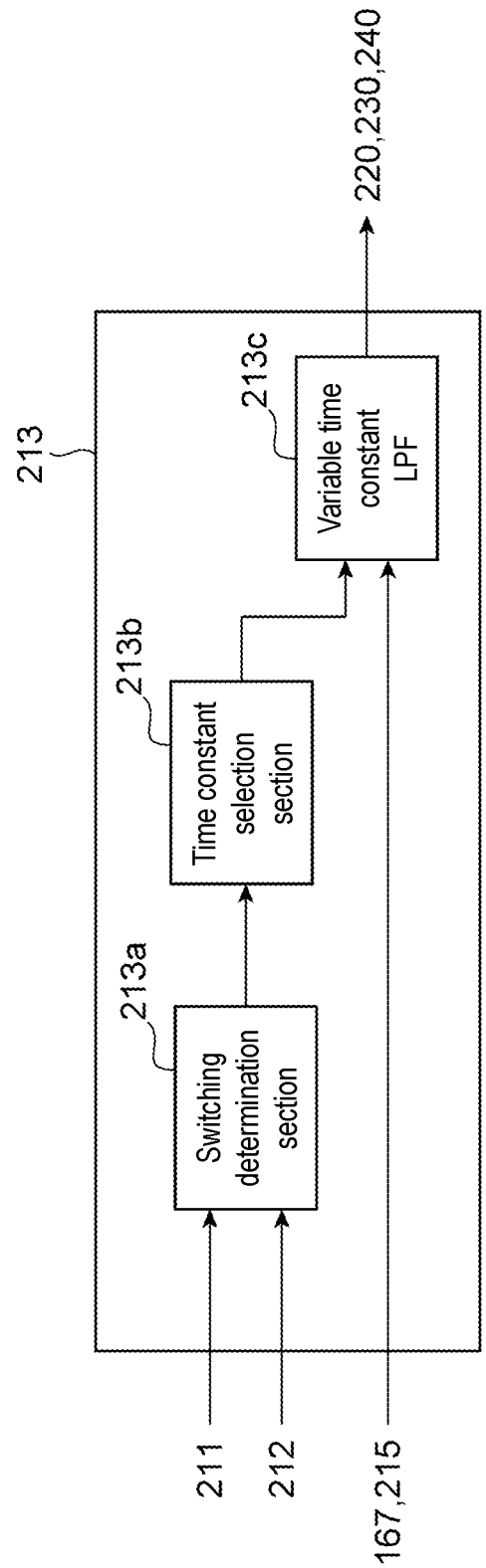
FIG. 5 is a block diagram showing an example of a smoothing section of the state calculation section in FIGS. 3 and 4.

FIG. 5 is a block diagram showing an example of the smoothing section 213 of FIGS. 3 and 4. For instance, the smoothing section 213 includes a switching determination section 213a, a time constant selection section 213b, and a variable time constant low-pass filter 213c.

The switching determination section 213a receives, as an input, the determination result of good or poor positioning quality output from the positioning quality determination section 211 and the traveling state of the work machine 100 output from the traveling state determination section 212. If the smoothing condition is not satisfied, the condition being that the input positioning quality is good and that the input traveling state of the work machine 100 is a stop state, the switching determination section 213a determines the time constant of the variable time constant low-pass filter 213c to be set at a first time constant.

In other words, if the input positioning quality is "No" or the input traveling state of the work machine 100 is traveling, the switching determination section 213a determines the time constant of the variable time constant low-pass filter 213c to be set to the first time constant, which is smaller than a second time constant described below. For instance, the first time constant may be zero. In this case, the processing intensity of the smoothing processing of the variable time constant low-pass filter 213c becomes zero, so that the GNSS information input to the variable time constant low-pass filter 213c is output as is. The first time constant may be a value larger than zero.

When a time equivalent to the update cycle of GNSS information has elapsed since the above-mentioned smoothing condition is satisfied, the switching determination section 213a determines that the time constant of the variable time constant low-pass filter 213c to be switched to the second time constant. The value of the second time constant is greater than the value of the aforementioned first time constant. For instance, the value of the second time constant is set to a value that allows the cutoff frequency of the variable time constant low-pass filter 213c to be lowered to smooth out small variations in the position information of the GNSS antennas 165, 166 that is calculated at the positioning calculation section 215 or GNSS receiver 167.

The time constant selection section 213b selects the first or second time constant to be used for the smoothing processing of the variable time constant low-pass filter 213c according to the determination result of the switching determination section 213a.

Small fluctuations in the position information of the GNSS antennas 165 and 166 when the work machine 100 stops is, for example, about a few centimeters, where the GNSS antennas 165 and 166 are actually fixed. Therefore, it is desirable to suppress the small fluctuations in the position information of the GNSS antennas 165, 166 in the stop state of the work machine 100 to a few millimeters, for example.

For the specific design of the second time constant, experimental data is obtained, in which the positional information slightly fluctuates as shown in graph (d) of FIG. 14, which will be described later. Then, for this experimental data, the second time constant of the variable time constant low-pass filter 213c is found by simulation so as to be capable of sufficiently suppressing small fluctuations, as shown in graph (e) of FIG. 14 described later. For instance, in the case of a typical hydraulic excavator, the desired result can be achieved by setting the second time constant to a few tens of seconds.

The first time constant, which is smaller than the second time constant, is desirably designed so that the position information of the GNSS antennas 165 and 166 calculated by the positioning calculation section 215 or GNSS receiver 167 can be provided with almost no delay. Thus, as mentioned above, the first time constant may be set to zero. However, it is desirable to design the first time constant within a range of, for example, 0.1 second to 1 second in order to suppress the influence of instantaneous variations in position information and outliers.

As described above, the smoothing section 213 performs smoothing processing to GNSS information including position information with the processing intensity in accordance with the positioning quality input from the positioning quality determination section 211 and the traveling state input from the traveling state determination section 212. As shown in FIGS. 3 and 4, the smoothing section 213 outputs the GNSS information including the smoothed position information to the position and posture calculation section 214.

The position and posture calculation section 214 receives, as an input, the GNSS information including the position information subjected to the smoothing processing by the smoothing section 213, and the posture of the front unit 110 and the upper slewing body 120 output from the IMUs 161 to 164. The position and posture calculation section 214 then calculates the position and posture of the work machine 100 in 3D space based on the input smoothed GNSS information and the posture of the front unit 110 and upper slewing body 120.

For instance, the above calculation by the position and posture calculation section 214 can be executed by performing coordinate transformation based on the mechanism of the work machine 100. For instance, the state calculation section 210 outputs the position and posture of the work machine 100 in 3D space calculated by the position and posture calculation section 214 to the construction target calculation section 220, the drive control section 230, and the guidance control section 240, as shown in FIG. 2.

The construction target calculation section 220 receives, as an input, the position and posture of the work machine 100 in 3D space that is output from the state calculation section 210. The construction target calculation section 220 also acquires construction information from the storage device 170. The construction target calculation section 220 then calculates a construction target, such as a construction target plane that defines a target shape of a construction target, based on the position and posture of work machine 100 in the 3D space and construction information. For instance, the construction target calculation section 220 outputs the calculated construction target to the drive control section 230 and guidance control section 240.

The drive control section 230 receives, as an input, the position and posture of the work machine 100 in 3D space that is output from the state calculation section 210, and the construction target that is output from the construction target calculation section 220. The drive control section 230 then controls the hydraulic system 140 in accordance with the input position and posture of the work machine 100 in 3D space and construction target. Specifically, the drive control section 230 calculates the operation of the front unit 110 based on the input information and controls the hydraulic system 140 to implement that operation.

That is, the drive control section 230 limits the operation of the boom cylinder 141, arm cylinder 142, and bucket cylinder 143 so that the distance between the tip of the bucket 113 and the target construction plane does not fall below a predetermined distance, for example. The drive control section 230 also controls the operation of the boom cylinder 141, arm cylinder 142, and bucket cylinder 143 so that the tip of the bucket 113 moves along the target construction plane, for example.

In this way, the drive control section 230 constitutes a part of the machine control system of the work machine 100. It is desirable that, if a warning is issued to the operator by the guidance control section 240 and guidance device 180 described below, the drive control section 230 also stops the machine control function of the hydraulic system 140.

The guidance control section 240 receives, as an input, the position and posture of the work machine 100 in 3D space that is output from the state calculation section 210, and the construction target that is output from the construction target calculation section 220. The guidance control section 240 then controls at least one of the display device, indicator lamp, speaker, and buzzer included in the guidance device 180 in accordance with the input position and posture of the work machine 100 in 3D space and construction target.

In this embodiment, the guidance control section 240 calculates the instruction content for operation support to the operator and controls the display device included in the guidance device 180, such as a liquid crystal display device or an organic EL display device, to display the content. Specifically, the guidance control section 240 controls the display device to display the position and posture of the front unit 110 with driven members such as the boom 111, arm 112, and bucket 113, the target construction plane, and the tip position and angle of the bucket 113, for example. In this way, the guidance control section 240 constitutes a part of the machine guidance system to assist the operation by the operator.

For instance, if an error occurs in the positioning results by the GNSS terminals 165 to 167 or if the angle detection accuracy by the IMUs 161 to 164 deteriorates, the guidance control section 240 controls the display device included in the guidance device 180 to display a warning. This allows the guidance control section 240 to notify the operator of the work machine 100 of the interruption of the machine guidance function via the guidance device 180.

When the guidance device 180 includes a speaker or buzzer, the guidance control section 240 can control the speaker or buzzer to emit voice or warning sounds, thus giving work guidance or alert the operator. The guidance device 180 may include an input device such as a touch panel or a keyboard, or may include a mobile information terminal such as a tablet terminal. For instance, the guidance control section 240 in this embodiment controls the tablet terminal included in the guidance device 180 to display operation support instructions and warnings on the display screen, and accepts an operator input from the touch panel of the tablet terminal.

For instance, in this embodiment, the machine guidance system includes the construction target calculation section 220 and the guidance control section 240. For instance, the machine control system includes the construction target calculation section 220 and the drive control section 230.

The following describes the operation of the electronic control unit or device 200 of the present embodiment while comparing it with the conventional position measurement device.

The machine guidance system presents various information to the operator so that the position of the tip (teeth) of the bucket 113 moves along the construction target plane. To this end, not only the position of work machine 100 but also the posture information of front unit 110 is important. Thus, the boom IMU 161, arm IMU 162, and bucket IMU 163 are attached to the boom 111, arm 112, and bucket 113, respectively.

The electronic control device 200 for three-dimensional (3D) information-based construction assists work by machine guidance and machine control using the coordinates of the work machine 100 at the construction site, and uses the GNSS terminals 165 to 167 to obtain the coordinates of the work machine 100. Then, the electronic control device 200 calculates specific points of the work machine 100, such as a boom foot pivot or a swivel center ground plane, using the acquired coordinates as a base point, for example. For instance, the electronic control device 200 also calculates the position of the teeth of the bucket 113 in the 3D space, while taking into account the posture of the front unit 110 calculated based on the detection results of the IMUs 161 to 164 and the angle sensor for the calculated specific points.

Typically, machine guidance and machine control are often used by the operator of the work machine 100 during finishing work that is performed when the landform during construction (current landform) is close to the construction target plane. In this finishing work, it is necessary to match the construction target plane with the current landform with high accuracy. Thus, in the finishing work, it is common to operate only the front unit 110 without turning or traveling the work machine 100 to stabilize the trajectory of the teeth of the bucket 113. That is, during the finishing work, the position and azimuth of work machine 100 typically do not change.

The front unit 110 of work machine 100 is made up of metal parts, so that the work machine 100 may reflect or shield GNSS satellite signals. Also, during excavation work by the work machine 100, the front unit 110 repeats vertical movement, so that reflection or shielding of satellite signals may occur repeatedly. In such a situation, the number of satellites, from which the GNSS antennas 165 and 166 are able to receive satellite signals, changes. This embodiment receives multiple satellite signals with the GNSS antennas 165 and 166, thus keeping the positioning state at RTK-Fix and continuing the positioning operation. However, the result of the positioning calculation may fluctuate due to changes in the number of satellites, from which satellite signals can be received, and the arrangement of the satellites. Therefore, even when the positions of the GNSS antennas 165, 166 do not actually fluctuate, the positions of the GNSS antennas 165, 166, which are the result of positioning calculations, may fluctuate by a few centimeters, for example, depending on the operation of the front unit 110.

If such a situation occurs in the finishing work described above, the position of work machine 100 provided by the machine guidance system will change depending on the operation of front unit 110. The operator or the machine control system controls the teeth position of the bucket 113 based on the position of the work machine 100. Therefore, the current landform formed by the bucket 113 may reflect changes in the position of the work machine 100, causing the current landform to appear wavy.

As described above, the conventional position measurement system includes a determination means that determines the operating state of the work machine, and a smoothing means that smooths the calculated values of the position and posture of the work machine that are calculated by the position and posture calculation means in accordance with the detection result of the determination means. This smoothing means is, for example, a filtering operation means that performs low-pass filtering on the time axis.

With this configuration, the conventional position measurement system for work machine calculates the absolute position and posture of a work machine in three-dimensional space and the absolute position of monitor points set on the work machine so as to reduce wobbling of the display. When the body of the work machine is not in a stationary state, this configuration reduces a deterioration in the display tracking performance.

Figure 13:
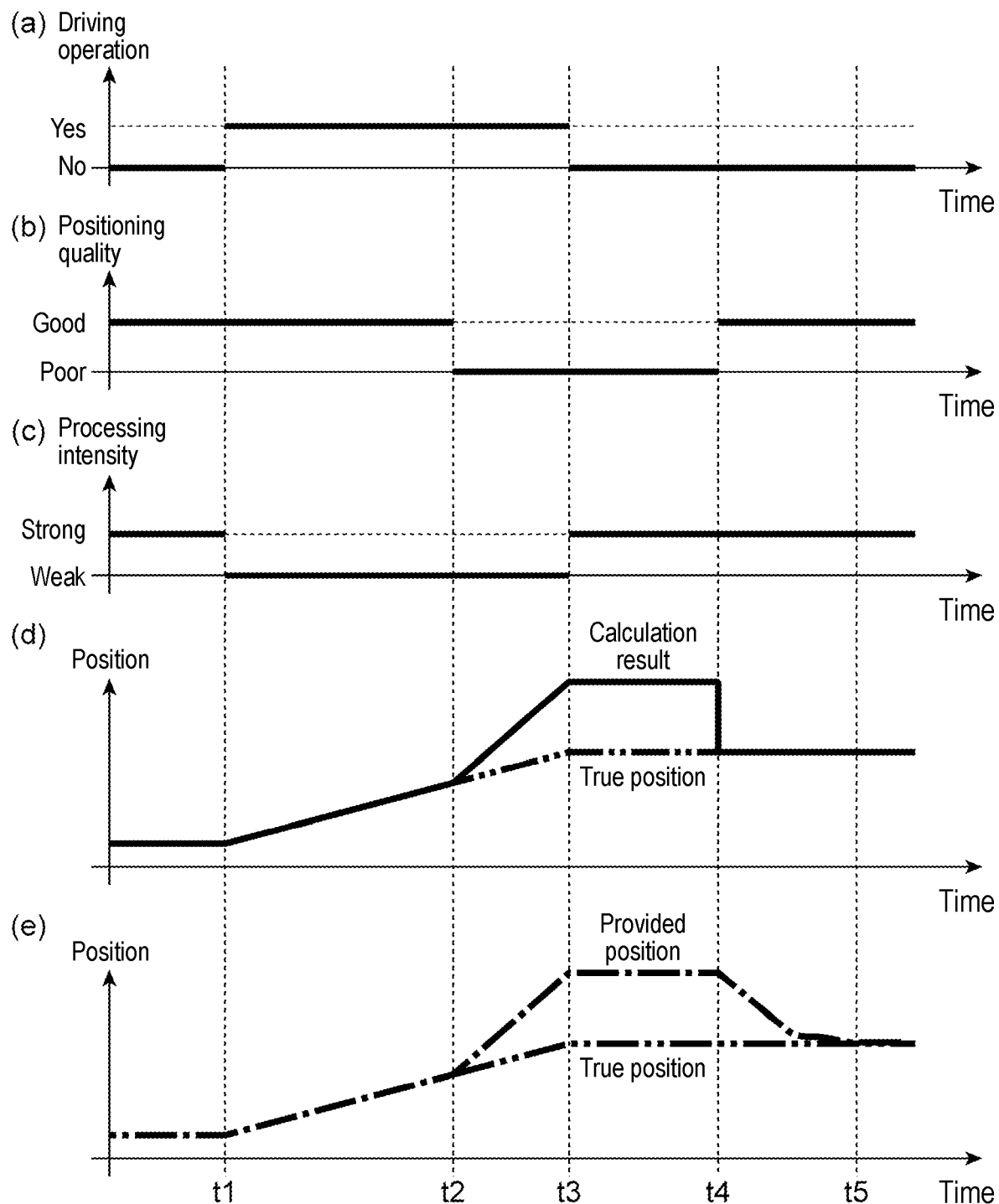
FIG. 13 is a graph showing temporal changes in various types of information about the work machine equipped with the conventional system.

This conventional position measurement system, however, generates an error in calculation results of the position and posture calculation means if the communication environment of a plurality of three-dimensional position measurement devices deteriorates, as described above. Subsequently, when the communication environment improves and the error in the calculation results is solved, a relatively long time is required before eliminating the error in position and posture of the work machine, which is the calculated values of the above-mentioned smoothing means. Referring to FIGS. 13 and 14, the following describes this problem of the conventional position measurement system.

FIG. 13 shows the graphs for a work machine equipped with the conventional position measurement system described above: (a) presence or absence of driving operation; (b) positioning quality of the position measurement system; (c) processing intensity of low-pass filter processing; (d) calculation results of positioning operation, and (e) temporal variation at the provided position by low-pass filter processing. FIG. 14 is an enlarged view up to time t1 of (d) the result of positioning operation and (e) the provided position by the low-pass filter processing shown in FIG. 13. Note that the positions shown in the graphs (d) and (e) of FIGS. 13 and 14 are one-dimensional positions for simplicity.

As shown in (a) of FIG. 13, the driving operation of the work machine is "No" until time t1. Therefore, in the conventional position measurement system, the processing intensity of the low-pass filter processing shown in (c) of FIG. 13 is "strong" until time t1, indicating that the cutoff frequency is low. This suppresses small variations in the positioning calculation result relative to the true positions of the GNSS antennas 165 and 166 shown in (d) of FIG. 14 at the provided position after low-pass filtering shown in (e) of FIG. 14.

From time t1 to time t2, the driving operation of the work machine shown in (a) of FIG. 13 is "Yes". During this time, in the conventional position measurement system, the processing intensity of the low-pass filter processing shown in (c) of FIG. 13 is "weak" indicating that the cutoff frequency is high. Therefore, the provided position after low-pass filtering shown in (e) of FIG. 13 changes without delay, following the position based on the positioning operation result shown in (d) of FIG. 13.

From time t2 and time t3, the positioning state of the GNSS terminal changes from RTK-Fix to a state other than RTK-Fix, such as independent positioning or differential positioning, and as shown in (b) of FIG. 13, the positioning quality deteriorates from good to poor. Then, as shown in (d) of FIG. 13, the deviation from the true position of the GNSS antenna increases in the calculation result of the position that is calculated based on satellite signals received by the GNSS terminal. As a result, the provided position after low-pass filtering by the conventional position measurement system shown in (e) of FIG. 13 similarly increases in deviation from the true position of the GNSS antenna.

From time t3 to time t4, as shown in (b) of FIG. 13, the positioning quality continues to be "poor". As shown in (a) of FIG. 13, the driving operation of the work machine changes from "Yes" to "No". As a result, the processing intensity of the low-pass filter processing shown in (c) of FIG. 13 changes to "strong" indicating that the cutoff frequency is low. During this time, however, the positioning quality shown in (b) of FIG. 13 continues to be "poor". Thus, both the calculated position shown in (d) of FIG. 13 and the provided position shown in (e) of FIG. 13 deviate from the true position of the GNSS antenna.

After time t4, the positioning state of the GNSS terminal returns to RTK-Fix and the positioning quality changes to "good" as shown in (b) of FIG. 13. This immediately returns the position according to the positioning operation result shown in (d) of FIG. 13 to the true position of the GNSS antenna. However, during this time, the processing intensity of the low-pass filtering process shown in (c) of FIG. 13 is "strong" in the conventional position measurement system. Thus, the provided position after low-pass filtering shown in (e) of FIG. 13 returns to the true position of the GNSS antenna with a delay, compared to the position based on the positioning operation result shown in (d) of FIG. 13.

In this way, as shown in (e) of FIG. 13, the conventional position measurement system described above continues to provide position information with a large error relative to the true position from time t4 to time t5, until the provided position after low-pass filter processing returns to the true position of the GNSS antenna. This means that the conventional position measurement system has a problem that it cannot provide a sufficient function as a machine guidance system from time t4 to time t5.

Figure 6:
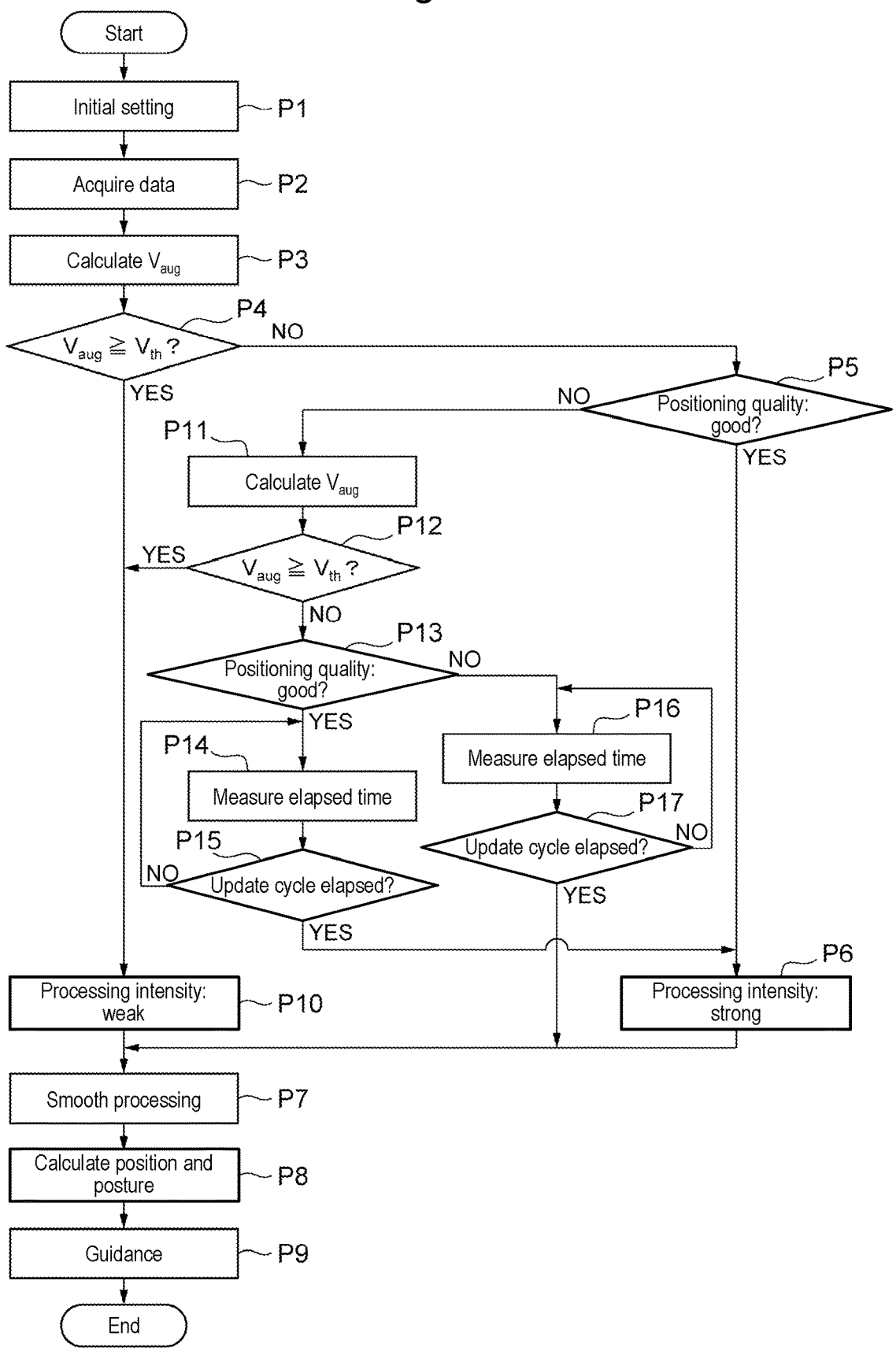
FIG. 6 is a flowchart showing an example of the process by the electronic control device in FIG. 3 or FIG. 4.
Figure 7:
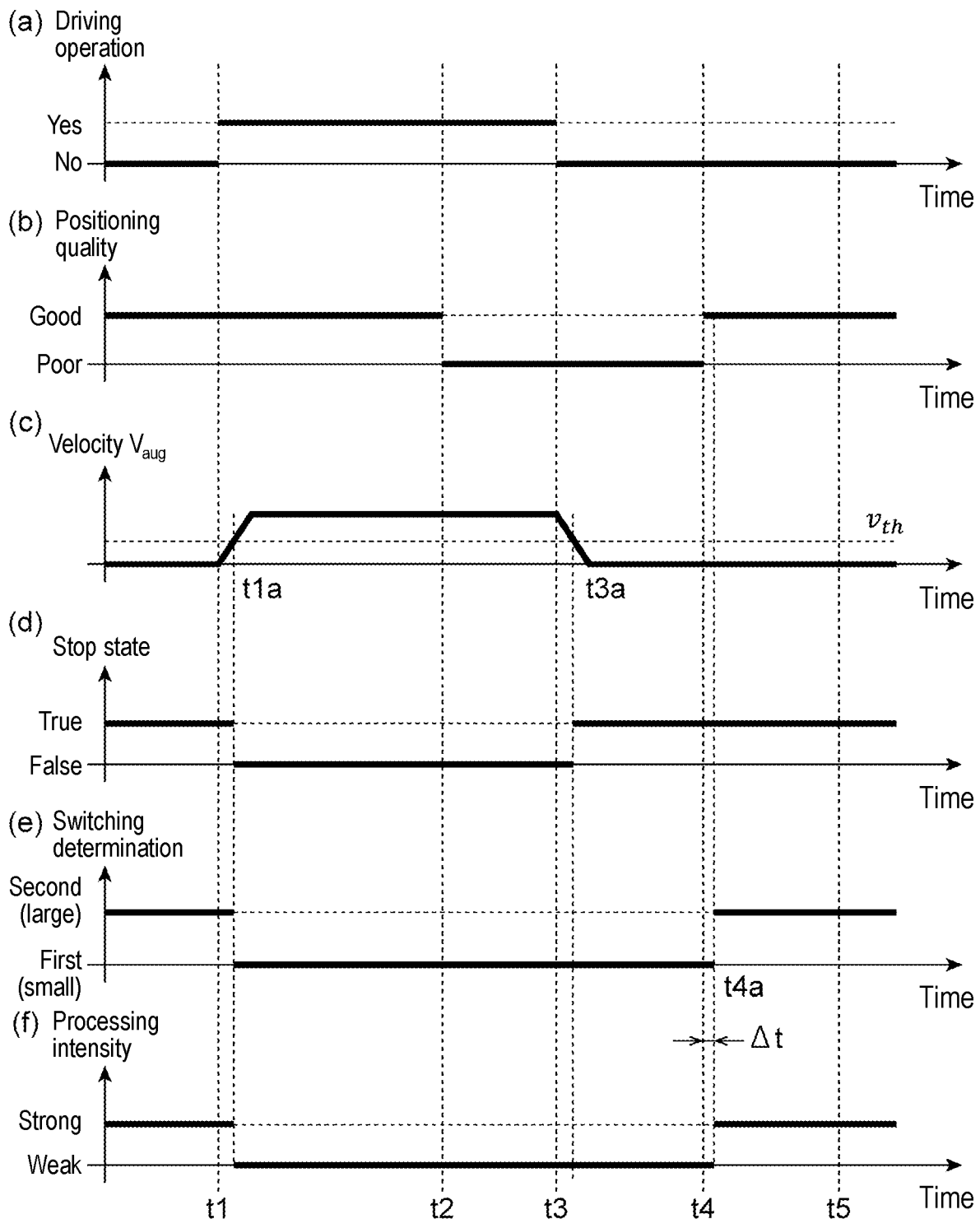
FIG. 7 is a graph showing temporal changes in various types of information about the work machine in FIG. 1.
Figure 8:
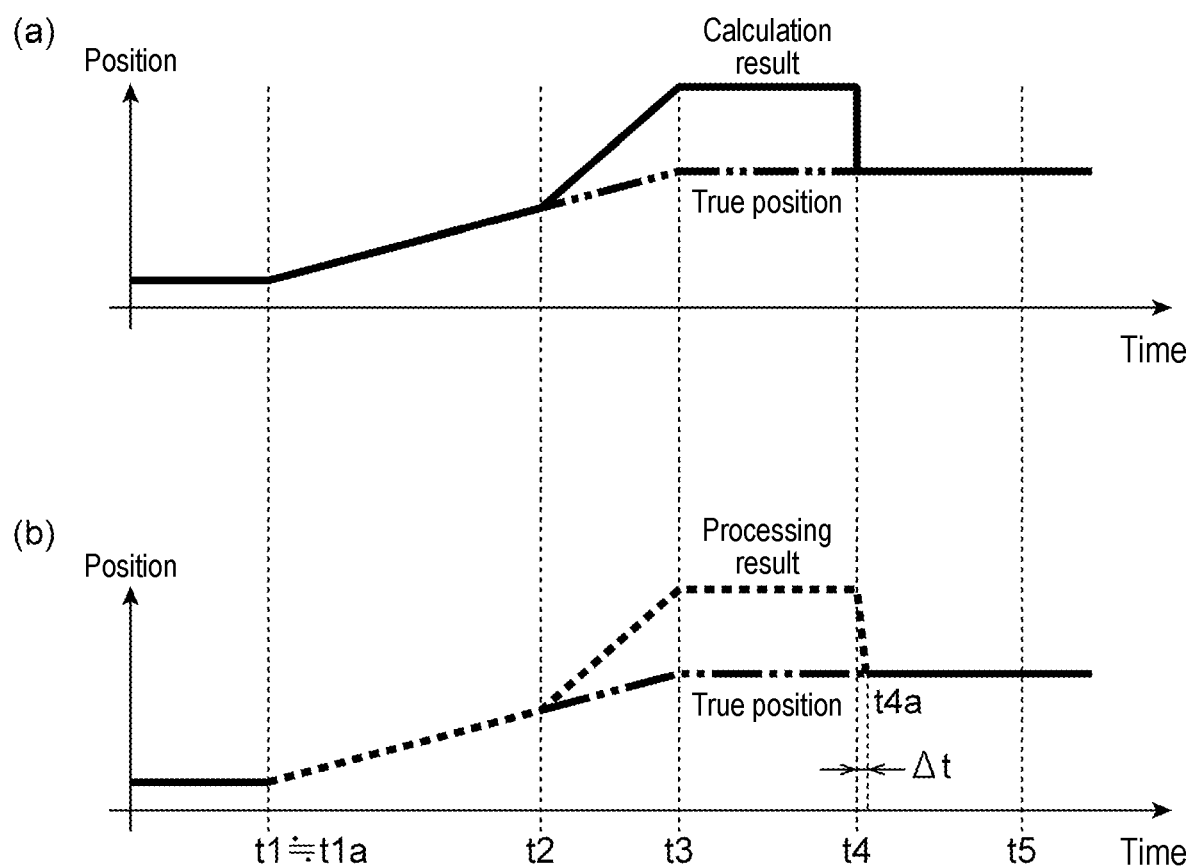
FIG. 8 is a graph showing temporal changes in various types of information about the work machine in FIG. 1.

In contrast, the electronic control device 200 of the present embodiment reduces the delay of the position output from the smoothing section 213 in the situation described above, compared to the conventional position measurement system. Referring to FIGS. 6 to 8, the following describes the operation of the electronic control device 200 according to the present embodiment.

FIG. 6 is a flowchart showing an example of the process by the electronic control device 200 of the present embodiment. When starting the process shown in FIG. 6, the electronic control device 200 first executes an initial setting step P1. In this initial setting step P1, the electronic control device 200 sets the initial time constant of the variable time constant low-pass filter 213c of the smoothing section 213.

This initial setting step P1 sets the processing intensity to be used before execution of step P6 or P10 that changes the processing intensity described below, and this step can be omitted after the execution of step P6 or P10 that changes the processing intensity described later. In this initial setting step P1, the electronic control device 200 sets the initial time constant to a first time constant that makes the processing intensity of the smoothing processing weak, for example. The electronic control device 200 then executes step P2 to acquire data.

In this step P2, the state calculation section 210 of the electronic control device 200 acquires the detection results of the position, posture, velocity, and others output from the GNSS terminals 165 to 167 and the IMUs 161 to 164, for example. Next, the electronic control device 200 uses the acquired velocity information and the above-described Equation (1a) to make the traveling state determination section 212 perform step P3 to calculate the synthesized velocity $v_{aug}$ in the 3D space of the work machine 100, for example. Next, the electronic control device 200 makes the traveling state determination section 212, for example, execute step P4 to determine the stop state of the work machine 100.

FIG. 7 shows the graphs for the work machine 100 of the present embodiment: (a) presence or absence of driving operation; (b) positioning quality of the GNSS terminals 165 to 167; (c) velocity and (d) stop determination of the work machine 100; (e) switching determination at the switching determination section 213a; and (f) an example of temporal variation of the processing intensity of the smoothing processing. FIG. 8 shows the graphs for the work machine 100 of the present embodiment: (a) calculation result of the position based on satellite signals; and (b) an example of temporal change of the processing result by the smoothing section 213.

In step P4 that determines whether the work machine 100 is in a stop state shown in FIG. 6, the electronic control device 200 makes the traveling state determination section 212, for example, determine whether the synthesized velocity V aug calculated at the previous step P3 is greater than or equal to the predetermined velocity threshold $v_{th}$ described above. In the example shown in FIG. 7, as shown in (a), the driving operation is performed at time t1, and as shown in (c), the synthesized velocity $v_{aug}$ of work machine 100 increases, where until time t1a, the velocity $v_{aug}$ is lower than the velocity threshold $v_{th}$.

In this case, in this step P4, the electronic control device 200 makes the traveling state determination section 212, for example, determine that until time t1a, the velocity $v_{aug}$ is less than the velocity threshold $v_{th}$, that is, the velocity $v_{aug}$ is not greater than or equal to the velocity threshold $v_{th}$ (NO). For instance, the velocity threshold $v_{th}$ is set to a value of about 0.1 [km/h], which is higher than the small velocity detected from the vibrations of the work machine 100, as described above. Therefore, the difference between time t1 and time t1a is actually very small. The electronic control device 200 then executes step P5 that determines the positioning quality.

In this step P5, the electronic control device 200 makes the positioning quality determination section 211 of the state calculation section 210, for example, determine whether the positioning quality is good or poor based on the positioning state including RTK-Fix or other states. In the example shown in FIG. 7, as shown in graph of (b), the positioning quality is "good" until time t1a. Thus, the positioning quality determination section 211 determines in this step P5 that the positioning quality is "good" (YES). The electronic control device 200 then executes step P6 that changes the processing intensity.

In this step P6, the electronic control device 200 makes the smoothing section 213 of the state calculation section 210, for example, change the processing intensity of the smoothing processing. Specifically, until time t1a shown in FIG. 7, in this step P6, the switching determination section 213a receives, as an input, "good" that is the positioning quality shown in (b) and the determination result of "true" for the stop state shown in (c) input as the traveling state.

Then, the switching determination section 213a determines that the smoothing condition is satisfied, the condition being that the positioning quality is good and that the traveling state of the work machine 100 is a stop state. The switching determination section 213a also determines whether a time equivalent to the GNSS information update cycle has elapsed, and it is assumed that this condition is satisfied in this case.

Then, the switching determination section 213a makes a determination to change the time constant of the variable time constant low-pass filter 213c to the second time constant for making the processing intensity of the smoothing processing "strong". As a result, the time constant selection section 213b selects the second time constant as the time constant of the variable time constant low-pass filter 213c. As a result, until time t1a, the processing intensity of the smoothing processing of the variable time constant low-pass filter 213c shown in (f) of FIG. 7 is "strong".

Next, the electronic control device 200 makes the smoothing section 213, for example, execute the smoothing processing P7. In this step P7, the smoothing section 213 performs smoothing processing using the variable time constant low-pass filter 213c, for example, with a "strong" processing intensity corresponding to the second time constant selected by the time constant selection section 213b to the GNSS information input from the GNSS receiver 167 or positioning calculation section 215.

This allows the electronic control device 200 of this embodiment to perform smoothing processing with a processing intensity of "strong" using the variable time constant low-pass filter 213c to the calculation result of position based on satellite signals as shown in (d) of FIG. 14, in the same way as the conventional position measurement system described above. Thus, when the traveling state is a stop state, the electronic control device 200 of this embodiment suppresses position fluctuations that are the result of the smoothing processing by the smoothing section 213, similar to the provided position by the aforementioned conventional position measurement system shown in (e) of FIG. 14.

After that, the electronic control device 200 makes the state calculation section 210, for example, execute step P8 that calculates the position and posture of the work machine 100. In this step P8, the state calculation section 210 makes the position and posture calculation section 214, for example, calculate the position and posture of the work machine 100 in the 3D space based on the GNSS information that has been smoothed and the posture of the front unit 110 and upper slewing body 120.

After that, the electronic control device 200 makes the guidance control section 240, for example, control the guidance device 180 to execute step P9 that provides guidance to the operator of the work machine 100. In this step P9, the guidance control section 240 controls a display device included in the guidance device 180, for example, to display the position and posture of the work machine 100 on the display device.

FIGS. 9A through 9D are image diagrams showing an example of images displayed on the screen of the display device 181 included in the guidance device 180. In these drawings, an image of the work machine 100 is displayed in a two-dimensional side view as an example, but the method of displaying the work machine 100 is not particularly limited. In these drawings, image G1 of the work machine 100 is image G1 that visually represents the posture of work machine 100 including the posture of the front unit 110.

Figure 9A:
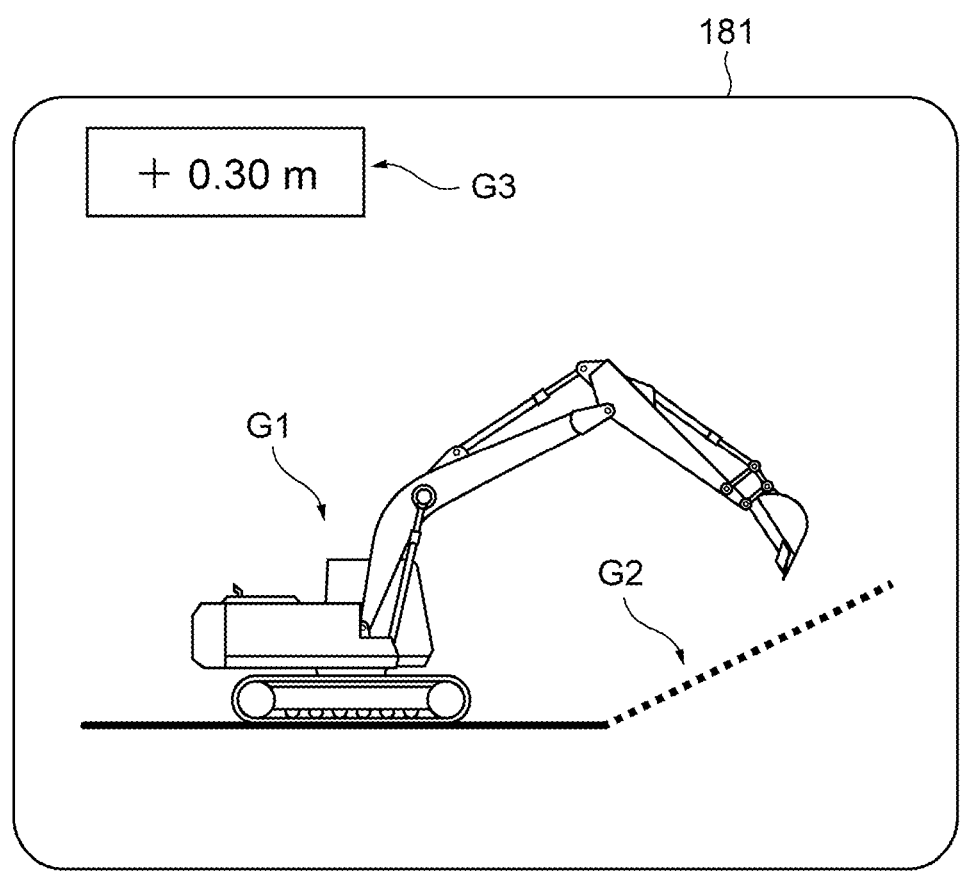
FIG. 9A is an image diagram showing an example of image displayed on the screen of the display device.

In FIG. 9A, image G2 of an inclined surface indicated by a dashed line in front of the work machine 100 is image G2 that visually represents the construction target plane. Image G3 of numerical values displayed in the upper left rectangular frame is image G3 indicating the distance between the teeth of bucket 113 of work machine 100 and the construction target plane, for example. For instance, the distance from the construction target plane has a positive value when the teeth of the bucket 113 is above the construction target plane, and becomes zero when the teeth of the bucket 113 is on the construction target plane. It has a negative value when the teeth of the bucket 113 is below the construction target plane that means excessive excavation.

After that, the electronic control device 200 ends step P9 shown in FIG. 6, and repeats the process flow shown in FIG. 6 at a predetermined cycle. After that, when time t1a has passed, the velocity of work machine 100 becomes equal to or higher than the predetermined velocity threshold $v_{th}$, as shown in (c) of FIG. 7. Then, the electronic control device 200 makes the traveling state determination section 212 determine in step P4 that determines the stop state of the work machine 100 as described above that the velocity $v_{aug}$ is greater than or equal to the velocity threshold $v_{th}$ (YES). The electronic control device 200 then executes step P10 that changes the intensity of the smoothing processing.

In this step P10, the electronic control device 200 makes the smoothing section 213 of the state calculation section 210, for example, change the processing intensity of the smoothing processing. Specifically, from time t1a to time t2 shown in FIG. 7, in this step P10, the switching determination section 213a receives, as an input, "good" that is the positioning quality shown in (b) and the determination result of "false" for the stop state shown in (d) input as the traveling state. Then, the switching determination section 213a determines that the smoothing condition is not satisfied, the condition being that the positioning quality is good and that the traveling state of the work machine 100 is a stop state.

From time t2 to time t3a shown in FIG. 7, in this step P10, the switching determination section 213a receives, as an input, "poor" that is the positioning quality shown in (b) and the determination result of "false" for the stop state shown in (d) input as the traveling state. Then, the switching determination section 213a determines that the smoothing condition is not satisfied, the condition being that the positioning quality is good and that the traveling state of the work machine 100 is a stop state.

Thus, if the stop state shown in (d) is "false", i.e., the work machine 100 is traveling, the switching determination section 213a determines that the smoothing condition is not satisfied, regardless of whether the positioning quality is good or poor. Then, the switching determination section 213a makes a determination to change the time constant of the variable time constant low-pass filter 213c to the first time constant for making the processing intensity of the smoothing processing "weak".

As a result, the time constant selection section 213b selects the first time constant as the time constant of the variable time constant low-pass filter 213c. As a result, from time t1a to time t3a, the processing intensity of the smoothing processing of the variable time constant low-pass filter 213c shown in (f) of FIG. 7 is "weak".

Next, the electronic control device 200 executes the smoothing processing P7 as described above, for example. In this step P7, the smoothing section 213 performs smoothing processing using the variable time constant low-pass filter 213c, for example, with a "weak" processing intensity corresponding to the first time constant selected by the time constant selection section 213b to the GNSS information input from the GNSS receiver 167 or positioning calculation section 215. After that, the electronic control device 200 executes step P8 and step P9 as described above, and ends the process flow shown in FIG. 6.

This allows the electronic control device 200 of this embodiment to stop or suppress the smoothing processing by the smoothing section 213 to the calculation result of position based on satellite signals during traveling of the work machine 100. Thus, according to the electronic control device 200 of the present embodiment, while the work machine 100 is traveling, the calculation result of the position of the work machine 100 based on GNSS satellite signals is output to the drive control section 230 and the guidance control section 240 via the smoothing section 213 without delay.

After time t2 shown in FIG. 7, the positioning quality shown in (b) is "poor". Thus, as shown in (a) of FIG. 8, after time t2, the deviation from the true position of the GNSS antennas 165 and 166 shown by the alternate long and two short dashes line increases in the calculation result of the position that is calculated based on GNSS satellite signals shown by the solid line. Here, the processing intensity of the smoothing processing by the smoothing section 213 is weak. Therefore, the position, which is the processing result of the smoothing processing shown by the dotted line in (b) of FIG. 8, follows the calculation result of the position shown in (a) of FIG. 8 with almost no delay.

When the driving operation shown in (a) of FIG. 7 stops at time t3, the increase is suppressed in deviation between the true positions of the GNSS antennas 165 and 166 shown by the alternate long and two short dashes line and the results of the position calculation and smoothing processing shown by the solid and dotted lines in (a) and (b) of FIG. 8. At time t3, when the driving operation shown in (a) of FIG. 7 stops, the synthesized velocity $v_{aug}$ of work machine 100 shown in (c) of FIG. 7 decreases. Then, after time t3a, the synthesized velocity $v_{aug}$ of the work machine 100 shown in (c) is lower than the velocity threshold $v_{th}$.

In this case, in this step P4 as described above, the electronic control device 200 makes the traveling state determination section 212, for example, determine that the velocity $v_{aug}$ is less than the velocity threshold $v_{th}$, that is, the velocity $v_{aug}$ is not greater than or equal to the velocity threshold $v_{th}$ (NO). As a result, as shown in (d) of FIG. 7, after time t3a, the determination result of the stop state by the traveling state determination section 212 is "true". The electronic control device 200 then executes step P5 that determines the positioning quality as stated above.

From time t3a to time t4, the positioning quality shown in (b) of FIG. 7 is "poor" as described above. Thus, the positioning quality determination section 211 determines that the positioning quality is not "good" (NO) in this step P5. Next, similar to step P3 as described above, the electronic control device 200 executes step P11 that calculates the synthesized velocity $v_{aug}$ in the 3D space of the work machine 100 again. For instance, this step P11 is executed to check the latest traveling state of the work machine 100 when the traveling state of the work machine 100 may have changed after the aforementioned step P3.

After that, similar to step P4 as described above, the electronic control device 200 makes the traveling state determination section 212 execute step P12 again to determine the stop state of the work machine 100. In this step P12, if the work machine 100 is traveling and the velocity $v_{aug}$ of the work machine 100 is equal to or greater than the predetermined velocity threshold $v_{th}$, the traveling state determination section 212 determines that the velocity $v_{aug}$ is equal to or greater than the predetermined velocity threshold $v_{th}$ (YES). In this case, the electronic control device 200 executes step P10 as described above to change the processing intensity of the smoothing section 213 to weak.

Figure 9B:
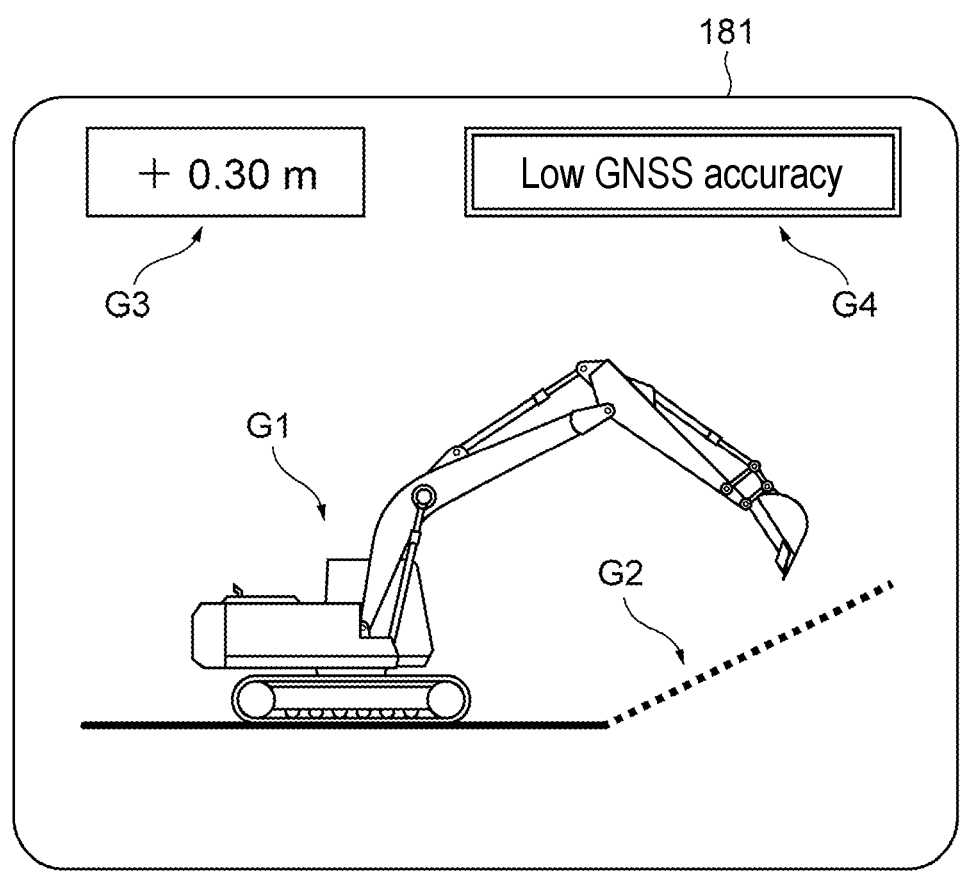
FIG. 9B is an image diagram showing an example of image displayed on the screen of the display device.

After that, the electronic control device 200 executes the smoothing processing P7, position and posture calculation processing P8 and guidance processing P9 as described above. In the guidance processing P9 in this case, the positioning quality is determined "poor" in the above-described step P5. Thus, as shown in FIG. 9B, for example, image G4 indicating that the detection accuracy of the position by GNSS is lowered is displayed on the screen of the display device 181.

However, in the example shown in FIG. 7, from time t3a to time t4, the velocity $v_{aug}$ of work machine 100 shown in (c) is less than the velocity threshold $v_{th}$. Thus, in step P12 as described above, the traveling state determination section 212 determines that the velocity $v_{aug}$ is not greater than or equal to the predetermined velocity threshold $v_{th}$ (NO). In this case, the electronic control device 200 also executes step P13 that determines the positioning quality similar to step P5 as stated above.

From time t3a to time t4, the positioning quality shown in (b) of FIG. 7 is "poor". Thus, in this step P13, the positioning quality determination section 211 determines that the positioning quality is not "good" (NO). In this case, the electronic control device 200 makes the switching determination section 213a of the smoothing section 213, for example, perform step P16 that measures the elapsed time and step P17 that determines whether the time corresponding to the GNSS information update cycle has elapsed. After the update cycle has elapsed, the electronic control device 200 keeps the time constant of the variable time constant low-pass filter 213c of the smoothing section 213 at the time constant set in the initial setting step P1 described above to execute steps P7 to P9 as described above, and ends the processing shown in FIG. 6.

Subsequently, at time t4, when the positioning quality shown in (b) of FIG. 7 changes from "poor" to "good", the electronic control device 200 makes the positioning quality determination section 211 determine in step P13 as described above that the positioning quality is "good" (YES). Then, the electronic control device 200 makes the switching determination section 213a of the smoothing section 213, for example, start step P14 to measure the time elapsed since the positioning quality changed from "poor" to "good".

Next, the electronic control device 200 makes the switching determination section 213a of the smoothing section 213, for example, perform step P15 that determines whether the time corresponding to the GNSS information update cycle has elapsed. In this step P15, if the switching determination section 213a determines that the update cycle has not elapsed (NO), the procedure returns to the previous step P14 and continues to measure the elapsed time.

Figure 9C:
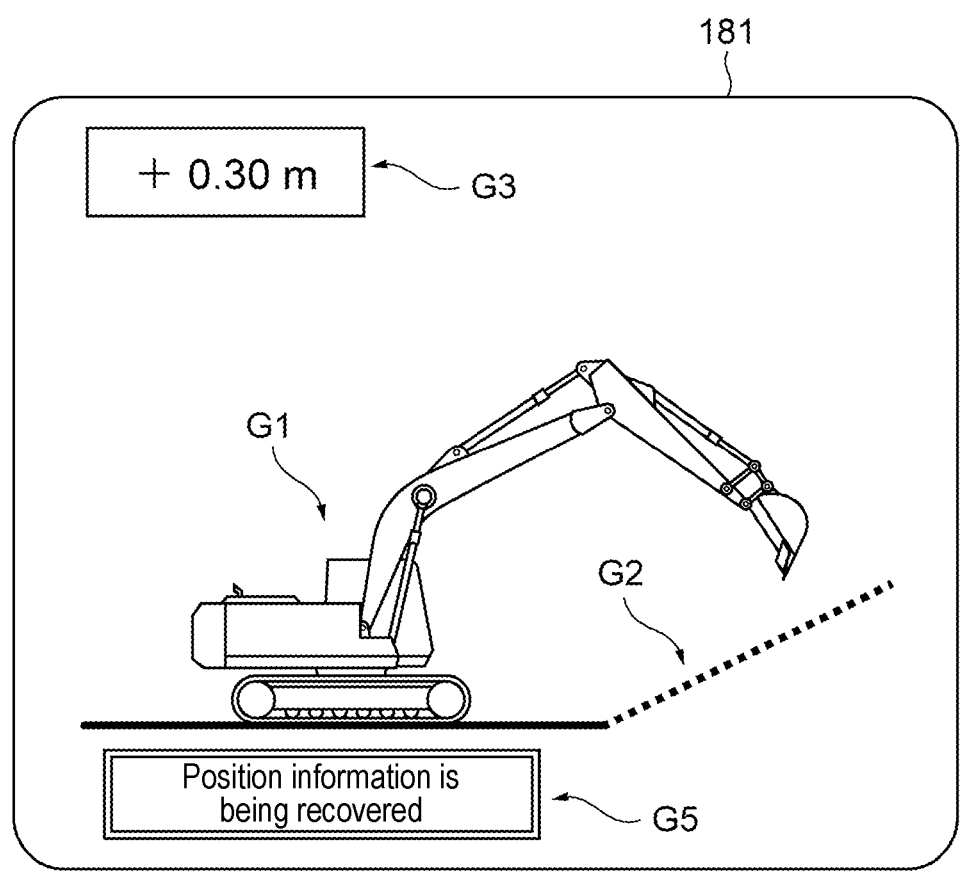
FIG. 9C is an image diagram showing an example of image displayed on the screen of the display device.

During the period from time t4 to time t4a, the electronic control device 200 may make the guidance control section 240, for example, control the display device 181 of the guidance device 180 to provide guidance to the operator of the work machine 100. Specifically, the electronic control device 200 may display image G5 indicating that the GNSS position information is being recovered on the display screen of the display device 181, as shown in FIG. 9C.

This allows the electronic control device 200 to notify the operator of the work machine 100 that the GNSS is capable of providing accurate position information, but the machine guidance system does not provide accurate position information. The display position of image G5 on the screen of display device 181 may be the same as the display position of image G4 shown in FIG. 9B.

From time t4 when the GNSS positioning quality becomes good, to time t4a when a time equivalent to the GNSS update cycle elapses, the processing intensity of the smoothing processing in the smoothing section 213 is maintained weak. Thus, as shown in (b) of FIG. 8, the position after the smoothing processing by the smoothing section 213 quickly and almost without delay follows the position calculation result based on the GNSS satellite signal shown in (a) of FIG. 8.

After that, when the above-described update cycle has passed at time t4a, the switching determination section 213a determines that the update cycle has passed (YES) in the above-described step P15. The electronic control device 200 then executes step P6 that changes the processing intensity as stated above. In this step P6, as shown in (e) of FIG. 7, the switching determination section 213a makes a determination to change the time constant of the variable time constant low-pass filter 213c to the second time constant for making the processing intensity of the smoothing processing "strong".

As a result, at time t4a, the time constant selection section 213b selects the second time constant as the time constant of the variable time constant low-pass filter 213c. As a result, after time t4a, the processing intensity of the smoothing processing of the variable time constant low-pass filter 213c shown in (f) of FIG. 7 is "strong". In this way, the electronic control device 200 changes the processing intensity of the smoothing processing to strong after a time equivalent to the GNSS information update cycle since the smoothing condition has been satisfied, the condition being that the positioning quality is good and the traveling state is stop.

As described above, the time Δt from time t4 to time t4a is set equal to or longer than the update cycle of GNSS information. The shorter the time Δt is set, the shorter the time until the machine guidance system becomes capable of providing accurate position information.

Figure 9D:
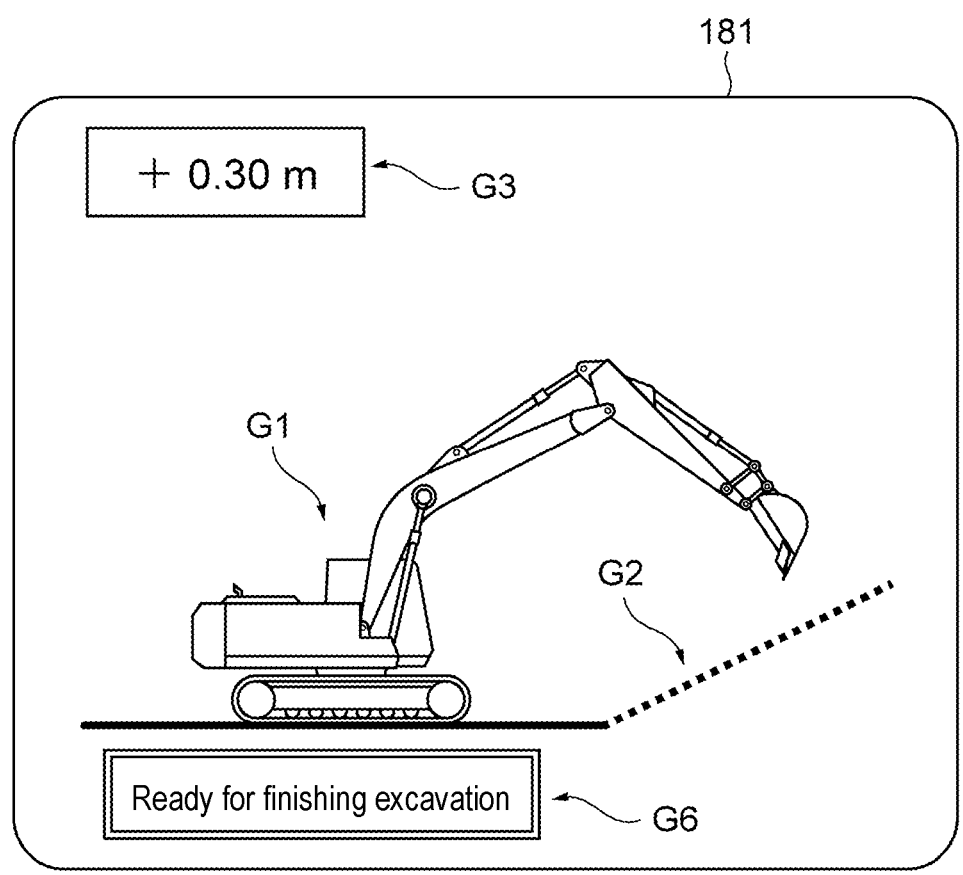
FIG. 9D is an image diagram showing an example of image displayed on the screen of the display device.

At time t4a, the electronic control device 200 may make the guidance control section 240, for example, control the display device 181 of the guidance device 180 to provide guidance to the operator of the work machine 100. Specifically, the electronic control device 200 may display image G6 on the display screen of the display device 181, indicating that the GNSS accurate position information can be provided and finish excavation is possible, as shown in FIG. 9D.

As described above, the electronic control device 200 of the present embodiment is mounted on the work machine 100 and includes the positioning quality determination section 211, the traveling state determination section 212, and the smoothing section 213. The positioning quality determination section 211 determines whether the positioning quality is good or poor based on GNSS information, including position information and positioning state, calculated from satellite signals received by the GNSS antennas 165 and 166 mounted on the work machine 100 and output at a predetermined update cycle. The traveling state determination section 212 determines the traveling state, including the stop state, of the work machine 100 based on the velocity information detected using the velocity detection device mounted on the work machine 100. The smoothing section 213 performs smoothing processing to the GNSS information with processing intensity according to positioning quality and traveling state. The smoothing section 213 performs smoothing processing to the GNSS information with the first intensity (strong) if the smoothing condition is satisfied, the condition being that the result of the positioning quality determination is good and the result of the traveling state determination by the traveling state determination section 212 is a stop state. If the smoothing condition is not satisfied, the smoothing section 213 performs smoothing processing to the GNSS information with the second intensity (weak), which has a lower processing intensity than the first intensity. When the state where the smoothing condition is not satisfied changes to the state where the smoothing condition is satisfied, the smoothing section 213 changes the processing intensity from the second intensity (weak) to the first intensity (strong) after a predetermined time (time corresponding to the update cycle) from the time the smoothing condition is satisfied.

With this configuration, the electronic control device 200 of the present embodiment suppresses variations of the position of the work machine 100 calculated based on the GNSS information due to a change in the GNSS communication environment, and eliminates the position error after improvement of the communication environment in a shorter time than before.

Specifically, if the smoothing condition is continuously satisfied, the condition being that the positioning quality is good and the traveling state is stop, the smoothing intensity of the smoothing section 213 in the electronic control device 200 of the present embodiment is set to "strong". With this configuration, similar to the conventional position measurement system described above, the electronic control device 200 of the present embodiment makes the smoothing section 213 perform smoothing processing, thus suppressing variations in the calculation result of the position based on satellite signal shown in (d) of FIG. 14, as in the provided position by the conventional position measurement system shown in (e) of FIG. 14.

In the electronic control device 200 of the present embodiment, the smoothing section 213 changes the processing intensity of the smoothing processing to weak if the smoothing condition is not satisfied, the condition being that the positioning quality is good and the traveling state is stop. This minimizes the delay caused by the smoothing processing by the smoothing section 213 while the work machine 100 is traveling, and allows the GNSS information including the position and azimuth of the work machine 100 to be provided quickly.

In the electronic control device 200 of the present embodiment, the smoothing section 213 changes the processing intensity to strong after a time equivalent to the GNSS information update cycle since the smoothing condition has been satisfied, the condition being that the positioning quality is good and the traveling state is stop. Thus, as shown in (b) of FIG. 8, the position that is the result of process by the smoothing section 213 quickly and almost without delay follows the position calculation result based on the GNSS satellite signal shown in (a) of FIG. 8.

In contrast, the aforementioned conventional position measurement system is configured so that the processing intensity of the low-pass filter process shown in (c) of FIG. 13 switches to "strong" when the positioning quality shown in (b) of FIG. 13 changes to "good". Thus, the provided position after low-pass filtering shown in (e) of FIG. 13 returns to the true position of the GNSS antenna with a delay, compared to the position based on the positioning operation result shown in (d) of FIG. 13.

That is, the conventional position measurement system requires a relatively long time between time t4 and time t5 after the difference between the calculation result of the position based on satellite signals and the true position of the GNSS antennas is eliminated as shown in (d) of FIG. 13, and before the difference between the provided position and the true position shown in (e) of FIG. 13 is eliminated.

In contrast, in the electronic control device 200 of the present embodiment, the difference between the calculation result of the position based on satellite signals and the true positions of the GNSS antennas 165 and 166 is eliminated at time t4 as shown in (a) of FIG. 8, the difference between the processing result and the true position shown in (b) of FIG. 8 is eliminated in a very short time until time t4a. The same applies to the azimuth of the work machine 100 as well as the position of the work machine 100.

As a result, when the time Δt between time t4 and time t4a is set to twice the update cycle of the GNSS information, the time required to provide an accurate position will be shortened by about 20 seconds, compared to the conventional position detection system as described above. The time Δt from when the smoothing section 213 satisfies the smoothing condition to when the processing intensity is changed to strong needs to be set to a time shorter than from time t4 to time t5 that is the time until the difference between the position provided by the conventional position measurement system and the true position is eliminated.

The electronic control device 200 of the present embodiment further includes the position and posture calculation section 214 that calculates the position of the work machine 100 based on the smoothed position information. This suppresses variations in position of the work machine 100 calculated by the position and posture calculation section 214 due to changes in the GNSS communication environment. This also eliminates the position error calculated by the position and posture calculation section 214 after improvement of the GNSS communication environment in a shorter time than before.

In the electronic control device 200 of the present embodiment, the GNSS information includes azimuth information calculated based on the position information of a plurality of GNSS antennas 165, 166 of the GNSS terminals 165 to 167. The position and posture calculation section 214 then calculates the azimuth of the work machine 100 based on the smoothed azimuth information. This suppresses variations in azimuth of the work machine 100 calculated by the position and posture calculation section 214 due to changes in the GNSS communication environment. This also eliminates the azimuth error calculated by the position and posture calculation section 214 after improvement of the GNSS communication environment in a shorter time than before.

In the electronic control device 200 of the present embodiment, the GNSS information includes GNSS velocity information based on the amount of change in position information per unit time. The velocity detection device also includes the positioning calculation section 215 or the positioning calculation section of the GNSS receiver 167 that calculates position information and velocity information from satellite signals. This allows the GNSS velocity information included in the GNSS information to be used to determine the traveling state by the traveling state determination section 212.

In the electronic control device 200 of the present embodiment, the GNSS terminals 165 to 167 may include a positioning calculation section that calculates GNSS information from satellite signals and outputs the information at predetermined update cycle. This configuration enables the electronic control device 200 without the positioning calculation section 215 that calculates GNSS information from satellite signals.

The electronic control device 200 of the present embodiment may further include the positioning calculation section 215 that calculates GNSS information from satellite signals and outputs it at a predetermined update cycle. This configuration enables GNSS information to be calculated from satellite signals by the positioning calculation section 215 of the electronic control device 200, even if the GNSS receiver 167 of the GNSS terminals 165 to 167 does not have a positioning calculation section.

The electronic control device 200 of the present embodiment further includes the guidance control section 240 that controls the guidance device 180 that provides guidance to the operator of the work machine 100. The guidance control section 240 controls the guidance device 180 to notify the operator that the work machine is in the state of unsuitable for work until the time corresponding to the update cycle has elapsed after the smoothing condition is satisfied, and after the time has passed, controls the guidance device 180 to notify the operator that the work machine is in the state of suitable for work.

With this configuration, the electronic control device 200 of the present embodiment informs the operator of the work machine 100 so that they can understand intuitively through visual or auditory means about whether the work machine 100 is in the state of suitable for work, as shown in FIGS. 9C and 9D, for example.

As described above, the present embodiment provides the electronic control device 200 capable of suppressing variations of the position of the work machine 100 calculated based on the GNSS information due to a change in the GNSS communication environment, and eliminating the position error after improvement of the communication environment in a shorter time than before.

Embodiment 2

Figure 10:
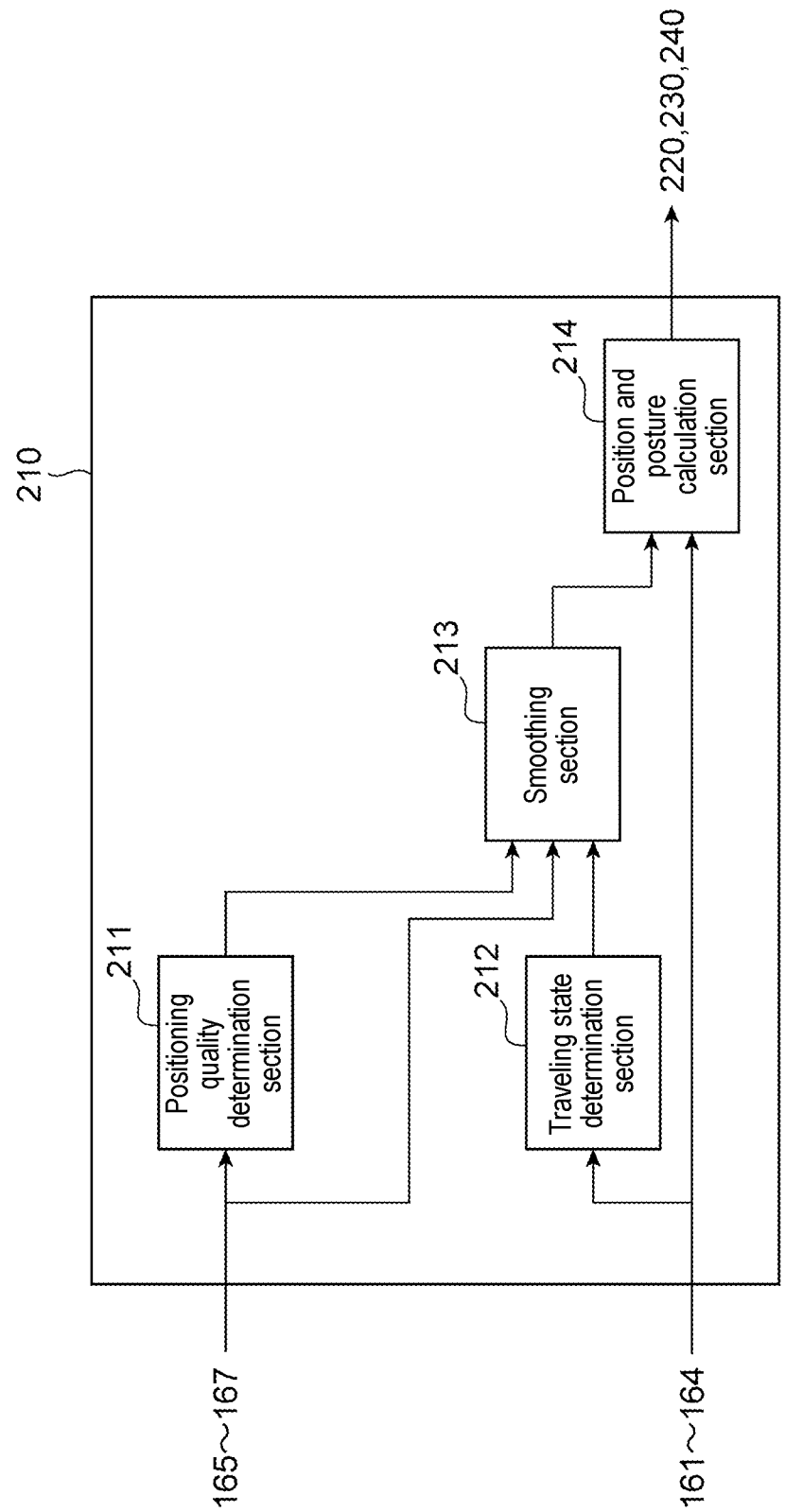
FIG. 10 is a block diagram showing one example of a state calculation section of the electronic control device in FIG. 2.

Referring to FIG. 10 together with FIGS. 1 and 2, the following describes an electronic control device that is Embodiment 2 according to the present disclosure. The electronic control device 200 of this embodiment differs from the electronic control device 200 of the above-described Embodiment 1 in the configuration of the state calculation section 210. The electronic control device 200 of the present embodiment is similar to the electronic control device 200 of Embodiment 1 in other respects. Therefore, like numerals indicate like parts, and their descriptions are omitted.

FIG. 10 is a block diagram showing one example of a state calculation section 210 of the electronic control device 200 in FIG. 2. In the electronic control device 200 of Embodiment 1 described above, the traveling state determination section 212 of the state calculation section 210 shown in FIG. 3 receives, as an input, velocity information output from the GNSS terminals 165 to 167 and determines the stop state of the work machine 100 based on that velocity information.

In the electronic control device 200 of the present embodiment, the traveling state determination section 212 of the state calculation section 210 shown in FIG. 10 receives, as an input, acceleration information of the work machine 100 output from a body IMU 164. For instance, the traveling state determination section 212 obtains the velocity of the work machine 100 by integrating the input acceleration of the work machine 100. In other words, in the present embodiment, the velocity detection device mounted on the work machine 100 includes the body IMU 164.

Thus, in the electronic control device 200 of the present embodiment, the velocity detection device includes the body IMU 164, which is an inertial measurement unit mounted on the work machine 100. This configuration allows the velocity of the work machine 100 to be detected by the body IMU 164. In general, the update cycle of the GNSS terminals 165 to 167 is, for example, about 1 second to 0.1 seconds. In contrast, the update cycle of IMUs 161 to 164 is about 0.01 seconds, for example.

Thus, compared to the configuration using the GNSS terminals 165 to 167 as the velocity detection device, this configuration using the body IMU 164 as the velocity detection device detects the stop and traveling states of the work machine 100 quickly and in a short time. This shortens the difference between time t1 and time t1a shown in FIG. 7, for example. Even if the position detection accuracy of the GNSS terminals 165 to 167 is lowered, this configuration detects the velocity of the work machine 100 accurately.

Embodiment 3

Figure 11:
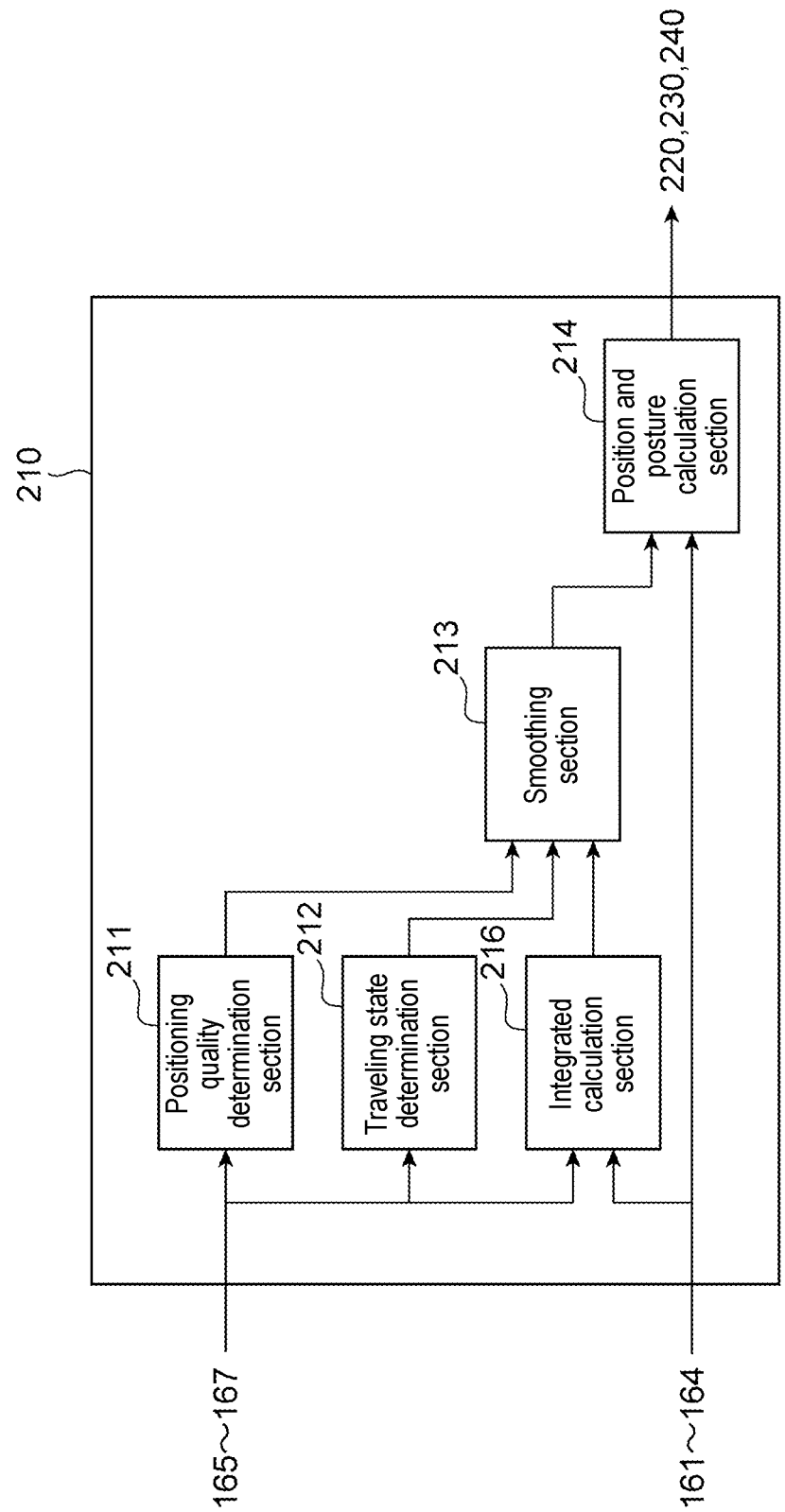
FIG. 11 is a block diagram showing one example of a state calculation section of the electronic control device in FIG. 2.

Referring to FIG. 11 together with FIGS. 1 and 2, the following describes an electronic control device that is Embodiment 3 according to the present disclosure. The electronic control device 200 of this embodiment differs from the electronic control device 200 of the above-described Embodiment 1 in the configuration of the state calculation section 210. The electronic control device 200 of the present embodiment is similar to the electronic control device 200 of Embodiment 1 in other respects. Therefore, like numerals indicate like parts, and their descriptions are omitted.

FIG. 11 is a block diagram showing one example of a state calculation section 210 of the electronic control device 200 in FIG. 2. In the electronic control device 200 of Embodiment 1 described above, the smoothing section 213 of the state calculation section 210 shown in FIG. 3 or FIG. 4 performs smoothing processing to the GNSS information including position and azimuth information of the GNSS antennas 165 and 166 output from the GNSS terminals 165 to 167 or positioning calculation section 215. In the electronic control device 200 of this embodiment, the state calculation section 210 shown in FIG. 11 further includes an integrated calculation section 216.

The integrated calculation section 216 outputs corrected GNSS information that supplements or corrects the position information contained in the above GNSS information, based on the acceleration and angular velocity detected by the body IMU 164, which is an inertial measurement unit mounted on the work machine 100. The integrated calculation section 216 also outputs the corrected GNSS information that supplements or corrects the azimuth information contained in the above GNSS information, based on the acceleration and angular velocity detected by the body IMU 164, which is an inertial measurement unit.

In this way, the integrated calculation section 216 receives, as an input, the GNSS information including the position information and azimuth information of the GNSS antennas 165 and 166 calculated by the GNSS receiver 167 or the positioning calculation section 215. The integrated calculation section 216 then applies sensor fusion using the GNSS information and the acceleration and angular velocity input from the body IMU 164, thus outputting corrected GNSS information that supplements and corrects the GNSS information.

This sensor fusion allows the position and azimuth of the work machine 100 to be calculated using the detections of the body IMU 164, which has a shorter update cycle, to supplement and correct the position and azimuth information contained in the GNSS information, which has a longer update cycle. Specifically, the Kalman filter expressed in Equations (2a) through (2d) below can be used to supplement and correct the position and azimuth information.

[Mathematical 2]

$$z_{k|k-1} = F_{k-1} z_{k-1|k-1} + G_{k-1} u_{k-1} + w_{k-1} \quad (2a)$$

$$z_{k|k} = z_{k|k-1} + K_k(y_k - H_k z_{k|k-1}) \quad (2b)$$

$$P_{k|k-1}^{zz} = F_{k-1} P_{k-1|k-1}^{zz} F_{k-1}^T + Q_{k-1} \quad (2c)$$

$$K_k = P_{k|k-1}^{zz} H_k (H_k P_{k|k-1}^{zz} H_k + R_k)^{-1} \quad (2d)$$

The Kalman filter is a method of estimating the estimated value $z_{k|k}$ of a state quantity $x_k$ based on the observed value $y_k$ at each time. Here, the state quantity corresponds to a position, an azimuth, and the like. Note that $P^{zz}_{k|k}$ is the variance/covariance matrix of the estimated value at each time, and $K_k$ is the Kalman gain. Also, $u_k$ is the control input at time k. $Q_k$ in Equation (2c) above is the process noise and $R_k$ is the variance of the observation noise. The superscript T in the above Equation (2c) is a symbol representing transpose of matrix.

The following describes an example of a method of applying the Kalman filter to complement and correct the position information using Equations (3a) and (3b) below.

[Mathematical 3]

$$\begin{bmatrix} p_k \\ v_k \end{bmatrix} = \begin{bmatrix} 1 & \delta t \\ 0 & 1 \end{bmatrix} \begin{bmatrix} p_{k-1} \\ v_{k-1} \end{bmatrix} + \begin{bmatrix} \delta t^2/2 \\ \delta t \end{bmatrix} a_{k-1} + w_{k-1} \quad (3a)$$

$$y_k = \begin{bmatrix} 1 & 0 \end{bmatrix} \begin{bmatrix} p_k \\ v_k \end{bmatrix} + v_k^p \quad (3b)$$

The above Equation (3a) is an equation of motion with the position p and the velocity v as the state quantity x. The above Equation (3a) expresses that the position p is the integrated value of the velocity v, and the velocity v is the integrated value of the acceleration a. The acceleration a is a value acquired by the body IMU 164 and is treated as a control input u. Note that $w_k$ is process noise, which is used to represent variations in acceleration acquired by the body IMU 164. The variance of this value corresponds to $Q_k$ in Equation (2c) above.

The above Equation (3b) is an observation equation, and treats the position information calculated by the GNSS receiver 167 or the positioning calculation section 215 as the observed value y. That is, assume that only position p is observable. Where $v^p_k$ is the observation noise and the variance of this value is $R_k$ in Equation (2d) above. Based on Equations (3a) and (3b) above, the position and azimuth calculated by the GNSS receiver 167 or positioning calculation section 215 can be interpolated and corrected by applying the Kalman filter of Equations (2a) to (2d).

As described above, the electronic control device 200 of this embodiment further includes the integrated calculation section 216. The integrated calculation section 216 outputs corrected GNSS information that supplements or corrects the position information input from the GNSS receiver 167 or positioning calculation section 215, based on the acceleration and angular velocity detected by the body IMU 164, which is an inertial measurement unit mounted on the work machine 100. The smoothing section 213 performs smoothing processing to the corrected GNSS information output from the integrated calculation section 216.

In the present embodiment, the GNSS information output from the GNSS receiver 167 or positioning calculation section 215 includes the azimuth information calculated based on the position information of a plurality of GNSS antennas 165, 166 of the GNSS terminals 165 to 167. In the electronic control device 200 of the present embodiment, the integrated calculation section 216 also outputs the corrected GNSS information that supplements or corrects the azimuth information based on the acceleration and angular velocity detected by the body IMU 164, which is an inertial measurement unit.

With this configuration, the electronic control device 200 of this embodiment not only achieves the same effects as those from the electronic control device 200 of Embodiment 1 described above, but also interpolates and corrects the position and azimuth calculated by the GNSS receiver 167 or positioning calculation section 215.

Embodiment 4

Figure 12:
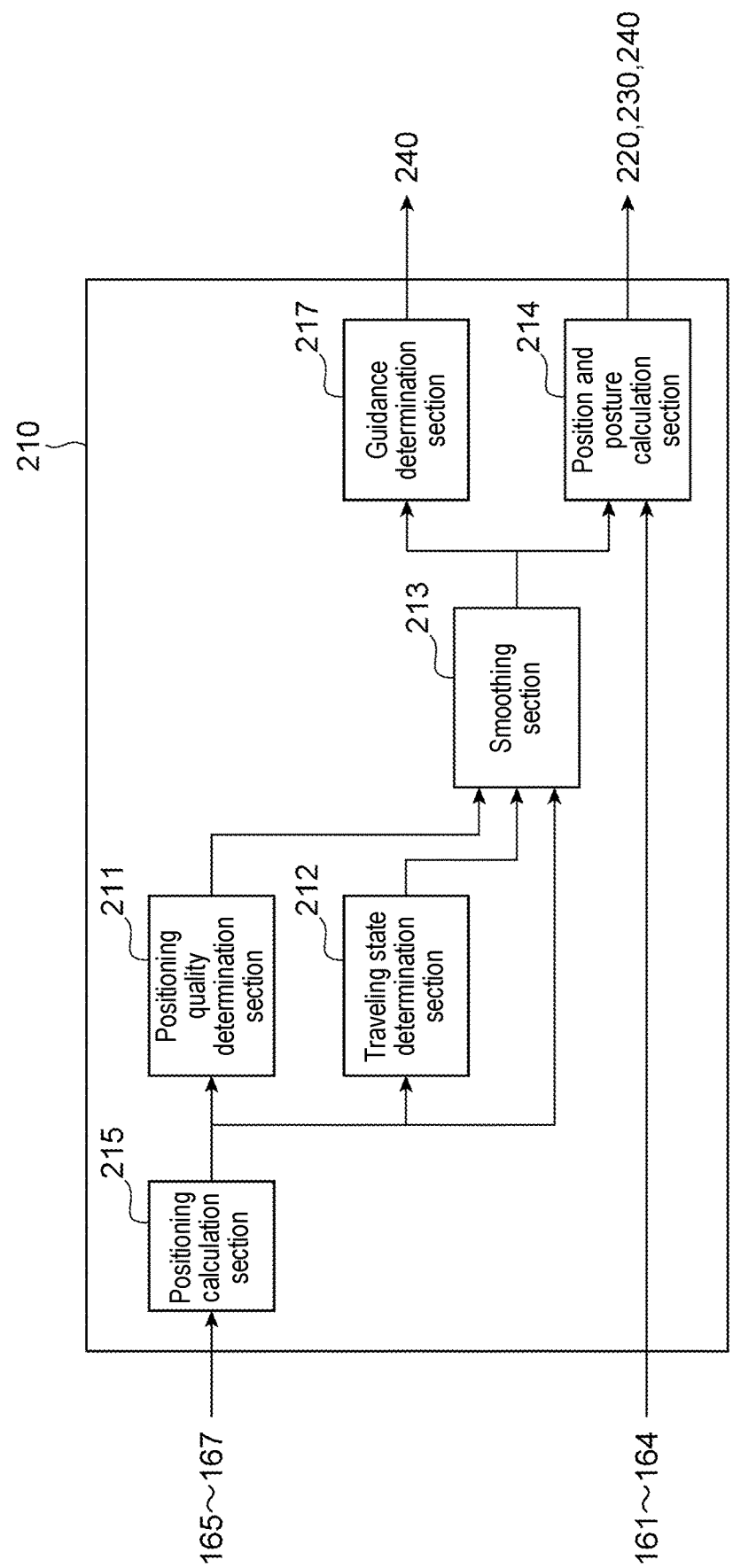
FIG. 12 is a block diagram showing one example of a state calculation section of the electronic control device in FIG. 2.

Referring to FIG. 12 together with FIGS. 1, 2, 7 and 9D, the following describes an electronic control device that is Embodiment 4 according to the present disclosure. The electronic control device 200 of this embodiment differs from the electronic control device 200 of the above-described Embodiment 1 in the configuration of the state calculation section 210. The electronic control device 200 of the present embodiment is similar to the electronic control device 200 of Embodiment 1 in other respects. Therefore, like numerals indicate like parts, and their descriptions are omitted.

FIG. 12 is a block diagram showing one example of a state calculation section 210 of the electronic control device 200 in FIG. 2. In the electronic control device 200 of this embodiment, the state calculation section 210 further includes a guidance determination section 217, in addition to the configuration of the state calculation section 210 of Embodiment 1 shown in FIG. 4. The guidance determination section 217 receives, as an input, switching information on processing intensity of the smoothing processing from the smoothing section 213.

Specifically, the smoothing section 213 outputs the switching determination of the time constant for the smoothing processing shown in (e) of FIG. 7, the processing intensity of the smoothing processing shown in (f) of FIG. 7, or their flag information to the guidance determination section 217. If the information input from the smoothing section 213 indicates that the intensity of the smoothing processing is "strong," the guidance determination section 217 outputs information or a flag indicating that the intensity of the smoothing processing is "strong" to the guidance control section 240.

The guidance determination section 240 receives, from the guidance determination section 217, as an input the information or flag indicating that the intensity of the smoothing processing is "strong". Then, as shown in FIG. 9D, the guidance control section 240 displays on the display section of the display device 181 that the GNSS positioning accuracy is good or that the state is suitable for finishing work, and recommends the operator to perform the finishing work.

That is, the intensity of the smoothing processing being "strong" is equivalent to being able to provide accurate position information by GNSS. Thus, the operator of the work machine 100 is notified that accurate position information can be provided at the same time that the intensity of the smoothing processing is switched to "strong". This improves the operator's workability.

That is a detailed description of the embodiments of the electronic control device of the present disclosure, with reference to the drawings. The specific configuration of the present disclosure is not limited to the above-stated embodiments, and the design may be modified variously without departing from the gist of the present disclosure. The present disclosure also covers such modified embodiments.

REFERENCE SIGNS LIST

100 Work machine
161 Boom IMU
162 Arm IMU
163 Bucket IMU
164 Body IMU 164 (inertial measurement unit, velocity detection device)
165 GNSS antenna (GNSS terminal)
166 GNSS antenna (GNSS terminal)
167 GNSS receiver (GNSS terminal, velocity detection device, positioning calculation section)
180 Guidance device
200 Electronic control device (electronic control unit)
211 Positioning quality determination section
212 Traveling state determination section
213 Smoothing section
214 Position and posture calculation section
215 Positioning calculation section (velocity detection device)
216 Integrated calculation section
240 Guidance control section

The invention claimed is:

1. An electronic control device to be mounted on a work machine, comprising:
a positioning quality determination section configured to determine whether positioning quality is good or poor based on GNSS information, the GNSS information including position information and a positioning state that are calculated from a satellite signal received by a GNSS antenna mounted on the work machine;
a traveling state determination section configured to determine a traveling state of the work machine based on velocity information detected using a velocity detection device; and
a smoothing section configured to perform smoothing processing to the GNSS information with a first intensity when a smoothing condition is satisfied, the smoothing condition being that a result of the positioning quality determination by the positioning quality determination section is good and a result of the traveling state determination by the traveling state determination section is a stop state, and to perform smoothing processing to the GNSS information with a second intensity lower than the first intensity when the smoothing condition is not satisfied,
when a state where the smoothing condition is not satisfied changes to a state where the smoothing condition is satisfied, the smoothing section maintaining the smoothing processing with the second intensity until a predetermined time has elapsed after a time of the change, and changing a processing intensity from the second intensity to the first intensity after the predetermined time.

2. The electronic control device for work machine according to claim 1, further comprising a position and posture calculation section configured to calculate a position of the work machine based on the smoothed position information.

3. The electronic control device for work machine according to claim 2, wherein the GNSS information includes azimuth information calculated based on the position information of the GNSS antenna, and
the position and posture calculation section calculates azimuth of the work machine based on the smoothed azimuth information.

4. The electronic control device for work machine according to claim 1, wherein the GNSS information includes GNSS velocity information based on an amount of change in the position information per unit time, and
the velocity detection device includes a positioning calculation section configured to calculate the position information and the GNSS velocity information from the satellite signal.

5. The electronic control device for work machine according to claim 1, wherein the velocity detection device includes an inertial measurement unit mounted on the work machine.

6. The electronic control device for work machine according to claim 1, further comprising an integrated calculation section configured to output corrected GNSS information that supplements or corrects the position information based on acceleration and angular velocity detected by an inertial measurement unit mounted on the work machine, wherein
the smoothing section performs the smoothing processing to the corrected GNSS information output from the integrated calculation section.

7. The electronic control device for work machine according to claim 6, wherein the GNSS information includes azimuth information calculated based on the position information of the GNSS antenna, and
the integrated calculation section outputs corrected GNSS information that supplements or corrects the azimuth information based on acceleration and angular velocity detected by the inertial measurement unit.

8. The electronic control device for work machine according to claim 1, further comprising a positioning calculation section configured to calculate the GNSS information from the satellite signal for outputting.

9. The electronic control device for work machine according to claim 1, further comprising a guidance control section configured to control a guidance device that provides guidance to an operator of the work machine, wherein
the guidance control section controls the guidance device to notify the operator that the work machine is in a state of unsuitable for work until a predetermined time has elapsed after the smoothing condition is satisfied, and after the predetermined time has passed, controls the guidance device to notify the operator that the work machine is in a state of suitable for work.

\* \* \* \* \*